US012443309B2

(12) United States Patent
Kim et al.

(10) Patent No.: US 12,443,309 B2
(45) Date of Patent: Oct. 14, 2025

(54) ELECTRONIC DEVICE FOR CONTROLLING TOUCH SENSITIVITY BASED ON RADAR AND METHOD OF OPERATING SAME

(71) Applicant: SAMSUNG ELECTRONICS CO., LTD., Suwon-si (KR)

(72) Inventors: Hyungsoon Kim, Suwon-si (KR); Junhyuk Park, Suwon-si (KR); Hyunwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/634,547

(22) Filed: Apr. 12, 2024

(65) Prior Publication Data

US 2024/0345682 A1    Oct. 17, 2024

Related U.S. Application Data

(63) Continuation of application No. PCT/KR2024/004526, filed on Apr. 5, 2024.

(30) Foreign Application Priority Data

Apr. 13, 2023    (KR) .................. 10-2023-0048978

(51) Int. Cl.
*G06F 3/041*    (2006.01)
*G06F 3/046*    (2006.01)

(52) U.S. Cl.
CPC ............ *G06F 3/0418* (2013.01); *G06F 3/046* (2013.01); *G06F 2203/04106* (2013.01)

(58) Field of Classification Search
CPC .................. G06F 3/0418; G06F 3/046; G06F 2203/04106
See application file for complete search history.

(56) References Cited

U.S. PATENT DOCUMENTS 10,620,766 B2    4/2020    Kim et al.
11,169,615 B2    11/2021    O'Reilley Stern et al.
(Continued)

FOREIGN PATENT DOCUMENTS

CN        114827468 A        7/2022
KR    10-0677316 B1        2/2007
(Continued)

OTHER PUBLICATIONS

International Search Report (PCT/ISA/210) issued on Jul. 11, 2024 by the International Searching Authority in International Application No. PCT/KR2024/004526.
(Continued)

*Primary Examiner* — Lisa S Landis
(74) *Attorney, Agent, or Firm* — Sughrue Mion, PLLC

(57) ABSTRACT

An electronic device includes memory storing instructions, a radar configured to transmit an electromagnetic signal and receive a radar signal which is a reflected signal of the electromagnetic signal, the reflected signal being reflected from at least one target object, a touch pad configured to detect a touch of a user based on a designated touch threshold value, and at least one processor operatively coupled with the memory, the radar, and the touch pad. The instructions may, when executed by the at least one processor, cause the electronic device to: obtain the radar signal received by the radar; identify, based on the radar signal, a surrounding environment of the electronic device, and adjust the touch threshold value based on the surrounding environment.

20 Claims, 19 Drawing Sheets

(56) References Cited

U.S. PATENT DOCUMENTS

| | | |
|---|---|---|
| 11,832,961 B2 | 12/2023 | Shin et al. |
| 2003/0117376 A1 | 6/2003 | Ghulam |
| 2008/0273755 A1 | 11/2008 | Hildreth |
| 2012/0084694 A1 | 4/2012 | Sirpal et al. |
| 2012/0218195 A1 | 8/2012 | Koh et al. |
| 2014/0002340 A1 | 1/2014 | Jordan et al. |
| 2015/0123937 A1 | 5/2015 | Schenkewitz |
| 2017/0371491 A1 | 12/2017 | Horikoshi et al. |
| 2018/0121008 A1 | 5/2018 | Teoh et al. |
| 2021/0132788 A1 | 5/2021 | Giusti et al. |
| 2023/0221408 A1* | 7/2023 | Zhang .................. G01S 13/865 342/54 |

FOREIGN PATENT DOCUMENTS

| | | |
|---|---|---|
| KR | 10-2012-0097002 A | 9/2012 |
| KR | 10-2014-0120619 A | 10/2014 |
| KR | 10-2019-0091126 A | 8/2019 |
| KR | 10-2020-0137454 A | 12/2020 |
| KR | 10-2021-0146417 A | 12/2021 |
| KR | 10-2023-0048342 A | 4/2023 |

OTHER PUBLICATIONS

Written Opinion (PCT/ISA/237) issued on Jul. 11, 2024 by the International Searching Authority in International Application No. PCT/KR2024/004526.

* cited by examiner

ELECTRONIC DEVICE FOR CONTROLLING TOUCH SENSITIVITY BASED ON RADAR AND METHOD OF OPERATING SAME

CROSS-REFERENCE TO RELATED APPLICATIONS

This application is a by-pass continuation application of International Application No. PCT/KR2024/004526, filed on Apr. 5, 2024, which is based on and claims priority to Korean Patent Application No. 10-2023-0048978, filed on Apr. 13, 2023, in the Korean Intellectual Property Office, the disclosures of which are incorporated by reference herein their entireties.

BACKGROUND

1. Field

The disclosure relates to an electronic device for controlling touch sensitivity based on radar and a method of operating the electronic device.

2. Description of Related Art

Radio detection and ranging (radar) refers to a technology that detects a target and determines a direction, distance, and speed of the target by measuring a reflected wave that returns after the radiated electromagnetic wave hits the target. An ultra-wideband (UWB) technology, which is one of radar technologies, may allow short-range and high-bandwidth communication using very low energy through relatively low radio spectral density over a wide frequency band. The UWB may have an occupied bandwidth of 20% or more of the center frequency or an occupied bandwidth of 500 MHz or more. The UWB may use a bandwidth of 500 MHz in the 3.1 GHz to 10.6 GHz frequency band and a signal with a very short pulse width of several nanoseconds (ns), and thus, can be robust against noise. The UWB may be used for ranging with high accuracy in centimeter (cm) units by using a double-sided two-way ranging (DS-TWR) method.

The UWB may be used for sensor data collection and accurate locating and tracking and may operate to recognize a surrounding environment of a mobile electronic device since very precise spatial recognition is possible. In accordance with development in wireless communication systems, various services may be available whereby requiring methods for effectively providing various services through electronic devices. For example, technologies may be studied for enhancing user's experience by controlling an operation of an electronic device by using the UWB.

SUMMARY

Provided is an operation of an electronic device based on a surrounding environment of the electronic device recognized through a radar.

Embodiments of the disclosure may control touch sensitivity of an electronic device including a touch pad according to a surrounding contact environment of the electronic device.

According to an aspect of the disclosure, an electronic device may include memory storing instructions, a radar configured to transmit an electromagnetic signal and receive a radar signal which is a reflected signal of the electromagnetic signal, the reflected signal being reflected from at least one target object, a touch pad configured to detect a touch of a user based on a designated touch threshold value, and at least one processor operatively coupled with the memory, the radar, and the touch pad. The instructions may, when executed by the at least one processor, cause the electronic device to obtain the radar signal received by the radar. The instructions may, when executed by the at least one processor, cause the electronic device to identify, based on the radar signal, a surrounding environment of the electronic device. The instructions may, when executed by the at least one processor, cause the electronic device to adjust a touch threshold value based on the surrounding environment.

According to an aspect of the disclosure, a method performed by an electronic device, may include transmitting an electromagnetic signal through a radar of the electronic device, and obtaining a radar signal which is a reflected signal of the electromagnetic signal, the reflected signal being reflected from at least one target object. The method may include identifying a surrounding environment of the electronic device based on the radar signal. The method may include adjusting a touch threshold value for a touch pad of the electronic device based on the surrounding environment.

A non-transitory computer-readable storage medium according to an embodiment stores at least one program, wherein the at least one program may include instructions configured to cause, when executed by at least one processor of an electronic device, the electronic device to transmit an electromagnetic signal through a radar of the electronic device, obtain a radar signal which is a reflected signal of the electromagnetic signal, which is reflected from at least one target object, identify a surrounding environment of the electronic device based on the radar signal, and adjust a touch threshold value for a touch pad of the electronic device based on the surrounding environment.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Before undertaking the detailed description below, it may be advantageous to set forth definitions of certain words and phrases used throughout the disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The term "set" means one or more. Accordingly, the set of items may be a single item or a collection of two or more items.

Figure 1:
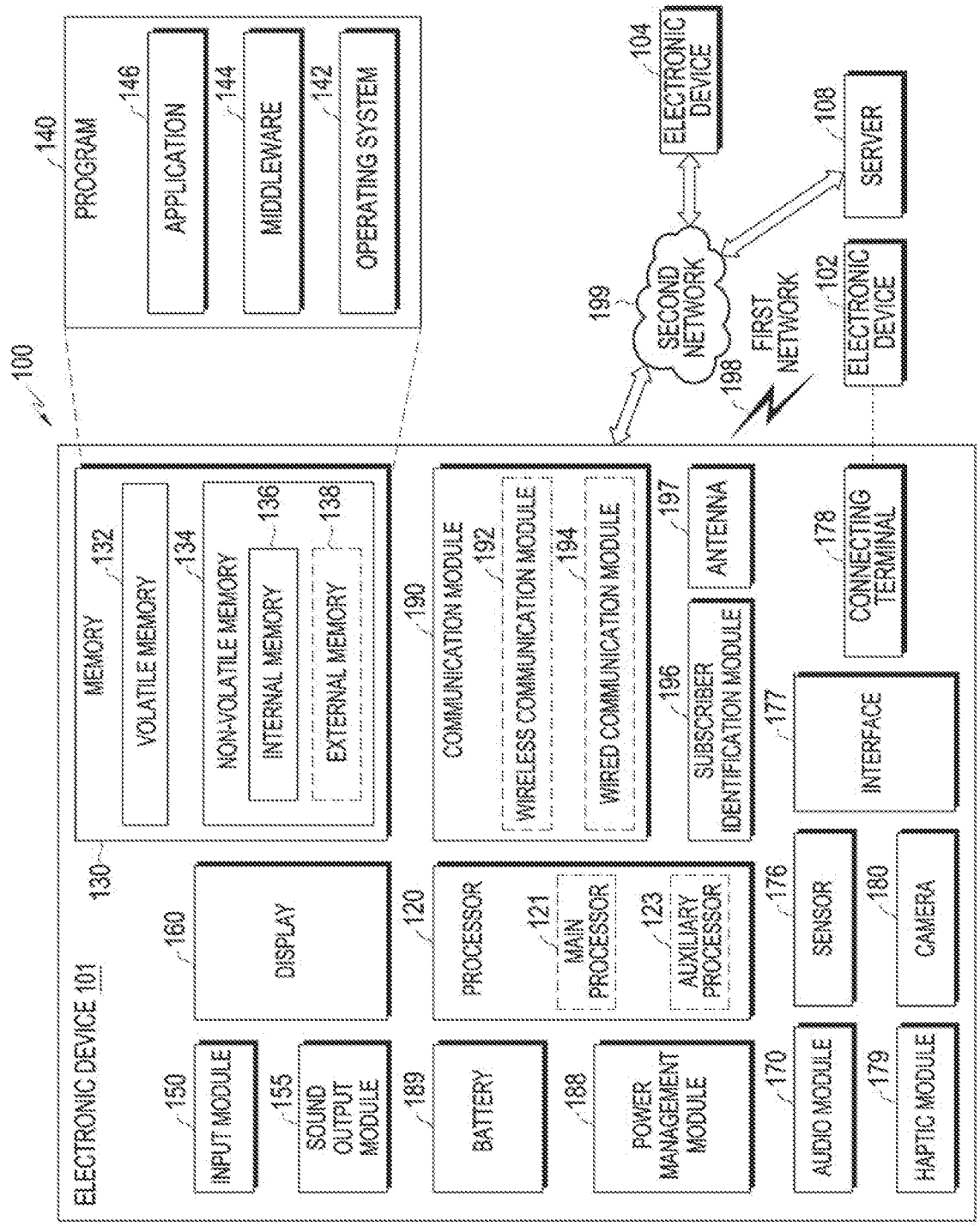
FIG. 1 illustrates an electronic device in a network environment according to various embodiments.

FIG. 1 is a block diagram illustrating an electronic device 101 in a network environment 100 according to embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display 160, an audio module 170, a sensor 176, an interface 177, a connecting terminal 178, a haptic module 179, a camera 180, a power management module 188, a battery 189, a communication module 190, a subscriber identification module (SIM) 196, or an antenna 197. In some embodiments, at least one of the components (e.g., the connecting terminal 178) may be omitted from the electronic device 101, or one or more other components may be added in the electronic device 101. In some embodiments, some of the components (e.g., the sensor 176, the camera 180, or the antenna 197) may be implemented as a single component (e.g., the display 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 160, the sensor 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application).

According to an embodiment, the auxiliary processor 123 (e.g., an image signal processor or a communication processor) may be implemented as part of another component (e.g., the camera 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna 197 may transmit or receive a signal or power to or from the outside (e.g., the external electronic device) of the electronic device 101. According to an embodiment, the antenna 197 may include an antenna including a radiating element composed of a conductive material or a conductive pattern formed in or on a substrate (e.g., a printed circuit board (PCB)). According to an embodiment, the antenna 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna 197.

According to various embodiments, the antenna 197 may form a mmWave antenna. According to an embodiment, the mmWave antenna may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
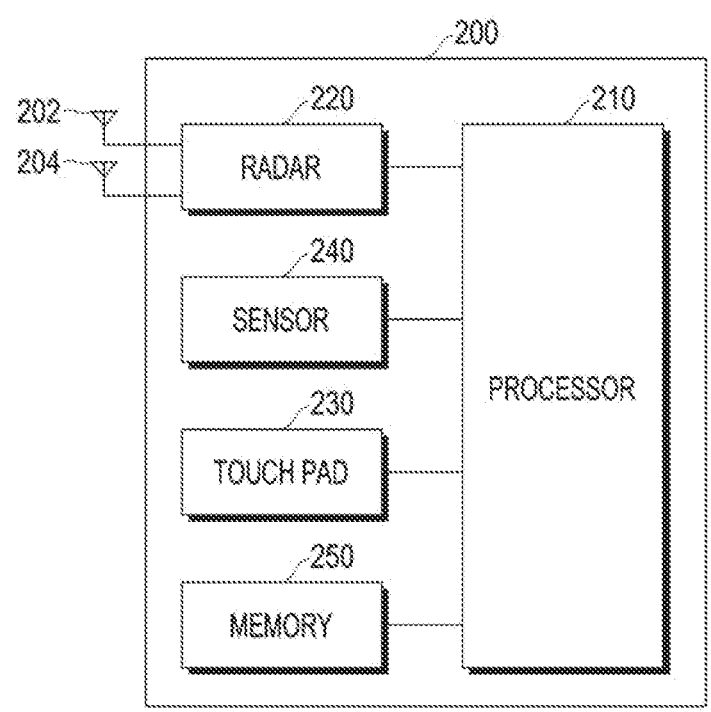
FIG. 2 illustrates a configuration of an electronic device including a radar according to an embodiment of the disclosure.

FIG. 2 is a block diagram illustrating a configuration of an electronic device including a radar according to an embodiment of the disclosure.

Referring to FIG. 2, an electronic device 200 (e.g., the electronic device 101) may include at least one of at least one processor 210 (e.g., the processor 120), a radar 220 (e.g., the wireless communication module 192), a touch pad 230 (e.g., the display 160), a sensor 240 (e.g., the sensor 176), or memory 250 (e.g., the memory 130) storing instructions. The at least one processor 210 may correspond to one processor or two or more processors (and their combinations). The at least one processor 210 may be referred as "a processor 210" and "the processor 210" in the disclosure. The at least one processor 210 includes or corresponds to circuitry like a central processing unit (CPU), a microprocessor unit (MPU), an application processor (AP), a coprocessor (CP), a system-on-chip (SoC), or an integrated circuit (IC). In an embodiment, the at least one processor 210 corresponds to two processors, and one processor is configured to perform some operations (functions) and the other processor is configured to perform the remaining operations.

In an embodiment, the radar 220 may support an ultra-wideband (UWB) technology or a frequency modulation continuous wave (FMCW) technology and may transmit or receive electromagnetic waves through at least one antenna (e.g., the antennas 202 and 204).

In an embodiment, the radar 220 may be included in the wireless communication module 192 of the electronic device 200 or may be electrically connected to the electronic device 200 as hardware independent from the wireless communication module 192. In an embodiment, at least a portion (e.g., an RF circuit and/or the antennas 202 and 204) of the radar 220 may be included in the electronic device 200 (e.g., the wireless communication module 192).

In an embodiment, the radar 220 may include at least one radar sensor and perform a ranging operation for recognizing a measurement object (e.g., a surface of an object with which the electronic device 200 is in contact) based on a radar technology (e.g., the UWB technology). In an embodiment, the ranging operation may include a distance ranging operation and/or an angle of arrival (AoA) ranging operation. The distance ranging operation may include an operation of measuring a distance between the radar 220 and the measurement object. The distance ranging operation may be performed based on time-of-flight (ToF) measurement using a ranging antenna (e.g., the antenna 202) but is not limited thereto. The AoA ranging operation may identify an arrival angle of a signal reflected from the measurement object and received by the radar 220. The AoA ranging operation may be performed based on a difference in signal reception time points of signals among one or more AoA ranging antennas (e.g., the antennas 202 and 204) but is not limited thereto.

In an embodiment, the processor 210 may include a controller or a processing circuit separately configured from the radar 220 or realized a portion of the radar 220. The processor 210 may execute the instructions stored in the memory 250. The instructions may, when executed by the processor 210, cause the electronic device 200 to control the components (e.g., the radar 220, the sensor 240, and/or the touch pad 230) of the electronic device 200. In an embodiment, the radar 220 may generate an RF signal based on control of the processor 210, and may transfer the RF signal to at least one antenna (e.g., the antenna 202 or 204) and/or process a signal (e.g., a radar signal) received by at least one antenna 202 or 204 to transfer a processing result thereof to the processor 210.

In an embodiment, a signal (e.g., an RF signal) transmitted from the radar 220 may be reflected after reaching an external object (e.g., an object with which the electronic device 200 is in contact) located within a field-of-view (FoV) of the radar, and the radar 220 may receive the reflected signal (i.e., referred to as a radar signal). Among the transmitted signals, a signal in an area that does not touch the external object continue to radiate, and only a signal in an area that touches the external object may be reflected. Some of radar signals reaching a partial object (e.g., the object with which the electronic device 200 is in contact) may be transmitted. By using the above-described properties, the electronic device (e.g., the processor 210) may recognize a surrounding environment (e.g., a finger, a finger wearing a glove, or an underwater environment) that the electronic device 200 is in contact with, from the radar signal.

In an embodiment, signals transmitted or received based on the UWB technology may be defined as signals having a bandwidth higher than a designated center frequency (for example, 0.5 GHZ). In an embodiment, the signals may be specified in a band of 3.1 to 10.6 GHz. The radar 220 may generate very short RF pulses in a sub-nanosecond range and may use the RF pulses for detection of external objects and image applications.

In an embodiment, with respect to the radar signal received through the antenna 202 or 204, the radar 220 may extract data samples from the radar signal by sampling via a high pass filter (HPF), a low noise amplifier (LNA), or a mixer, and may store (e.g., buffer) a designated number (e.g., 10 to 20 pieces) of data samples. Each of the stored data samples may indicate how far from the radar 220 the radar signal was reflected. The electronic device 200 (e.g., the processor 210) may analyze the collected radar signals (e.g., the data samples) and recognize a surrounding environment that the electronic device 200 is in contact with.

In an embodiment, the sensor 240 may include (or correspond to) at least one sensor element (e.g., at least one of a geomagnetic sensor, a magnetic sensor, a proximity sensor, or touch sensor) and transfer sensor data collected by each sensor or a processing result thereof to the processor 210.

The processor 210 may extract the surrounding environment (e.g., a surrounding environment that the electronic device 200 is in contact with) of the electronic device 200 based on the radar signal or a processing result thereof and/or the sensor data or a processing result thereof. In an embodiment, the surrounding environment may include at least one of (1) a glove mode in which a user touches the electronic device 200 (e.g., the touch pad 230) with a finger wearing a glove, (2) an underwater mode in which the electronic device 200 is located in water, or (3) a soft surface mode in which the electronic device 200 is located on a relatively soft material such as a sofa or a mattress. The processor 210 may adjust touch sensitivity of the touch pad 230 based on the detected surrounding environment.

In an embodiment, the touch pad 230 may include electrode sets (e.g., multiple electrodes 1110) arranged in an X direction and a Y direction to detect an approach or contact of a touch device (e.g., a finger or a stylus pen). An electrode that the touch device approaches may further include a capacitance. The touch pad 230 may detect the touch device approaching or coming in contact with the touch pad 230 based on a change in the capacitance of an electrode or a change in mutual capacitance between adjacent electrodes. The touch pad 230 may support a multi-touch for simultaneously detecting an approach of the touch device at multiple electrodes.

The touch pad 230 may detect an approach of a touch device based on a size of a physical quantity that responds to a voltage applied to electrodes and may detect coordinates at which the touch device is detected. Here, the physical quantity (e.g., a touch input value) used for detecting the touch device may include one of a charging time, a voltage, a current, or a capacitance. In a case that a physical quantity detected at specific coordinates exceeds a threshold value (e.g., at least one touch threshold value), the touch pad 230 may recognize an approach or contact of the touch device and designate the coordinates thereof. In an embodiment, a detected physical quantity generated by noise may be smaller than a detected physical quantity generated by the touch device intended by the user. Therefore, increasing the touch threshold value lowers the probability of recognizing noise as the touch device, but concurrently, may lower the probability of detecting the touch device.

The threshold value for comparing detected physical quantities at the touch pad 230 may be associated with a sensitivity (e.g., touch sensitivity) level for detecting the touch device. The lower the threshold value, the lower the touch sensitivity of the touch pad 230. The processor 210 may control the threshold value to lower or increase the touch sensitivity in a designated touch environment (e.g., the glove mode, the underwater mode, or the soft surface mode).

In an embodiment, by using the radar 220 and/or the sensor 240, the processor 210 may detect that a first state of a finger coming in contact with the touch pad 230 and a second state of a hand holding the electronic device 200 are different (e.g., the glove mode), and may transmit, to the touch pad 230, a signal indicating to perform an operation of decreasing (lowering) the threshold value associated with the touch sensitivity of the touch pad 230. Based on a lower threshold value, the touch pad 230 may detect a touch by the finger coming in contact with the touch pad 230 more accurately.

In an embodiment, the processor 210 may detect, by using the radar 220 and/or the sensor 240, that the electronic device 200 is in the glove mode, and may transmit, to the touch pad 230, a signal indicating to increase the threshold value associated with the touch sensitivity of the touch pad 230. Based on a higher threshold value, the touch pad 230 may detect a touch by the finger wearing a glove more accurately.

In an embodiment, the processor 210 may detect, by using the radar 220 and/or the sensor 240, that the electronic device 200 is in the underwater mode, and may transmit, to the touch pad 230, a signal indicating to lower the threshold value associated with the touch sensitivity of the touch pad 230. Based on a lower threshold value, the touch pad 230 may detect a touch in water more accurately.

Figure 3A:
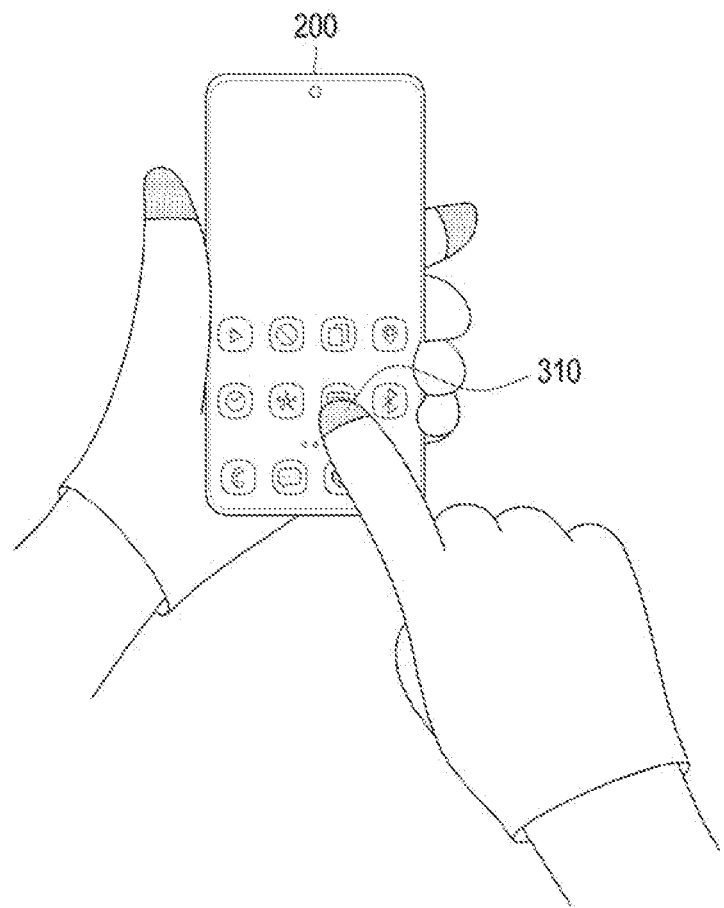
FIG. 3A illustrates touch detection in a glove mode according to an embodiment.

FIG. 3A is a view illustrating touch detection in a glove mode according to an embodiment.

Referring to FIG. 3A, the user may touch a display (e.g., the touch pad 230) of the electronic device 200 with a finger 310 wearing a glove. When the electronic device 200 tries to detect a touch by the finger 310 by using a normal touch threshold value not knowing that the user wears gloves, a detection of the touch of the finger 310 wearing a glove may fail.

Figure 3B:
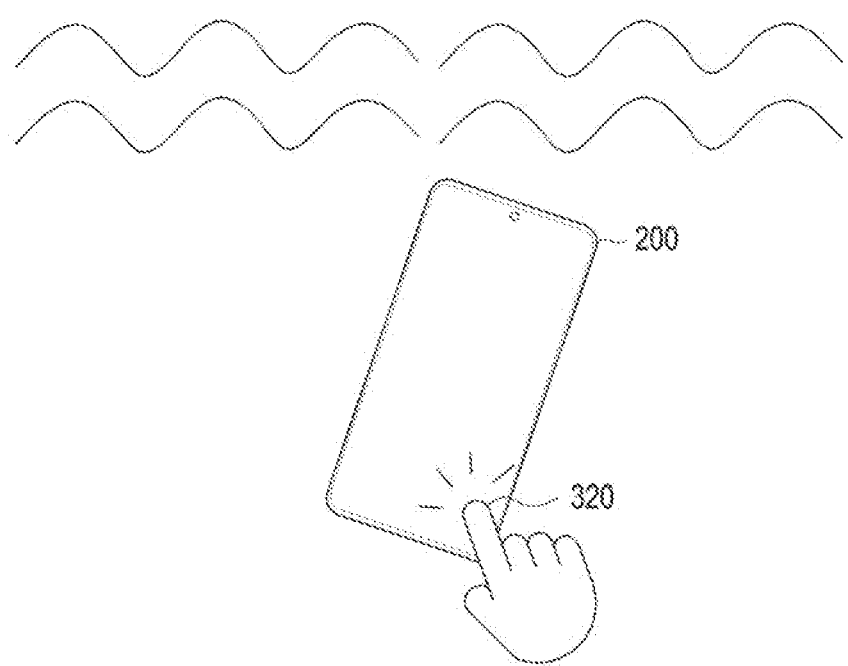
FIG. 3B illustrates a touch detection in an underwater mode according to an embodiment.

FIG. 3B is a view illustrating a touch detection in an underwater mode according to an embodiment.

Referring to FIG. 3B, the user may touch a display (e.g., the touch pad 230) of the electronic device 200 with a finger 320 in a state in which the electronic device 200 is underwater. When the electronic device 200 tries to detect a touch by using a normal touch threshold value without recognizing that the electronic device 200 is underwater, a detection of the touch of the finger 320 may fail.

In an embodiment, the electronic device 200 may adjust a touch threshold value associated with the touch sensitivity of the touch pad 230 according to a surrounding environment that the electronic device 200 comes in contact with or belongs to.

In an embodiment, the electronic device 200 may control an operation (e.g., an incoming call notification or lost alert) of the electronic device 200 according to a surrounding environment of the electronic device 200. For example, in a case that the electronic device 200 is located on a soft surface such as on a blanket, a sofa, or a mattress, the user may have a difficulty detecting vibration caused by an incoming call even when the electronic device 200 receive the incoming call. The electronic device 200 may activate a sound mode for the incoming call notification based on detecting that the surrounding environment is a soft surface. For example, when detecting that the electronic device 200 does not move for a designated time period in a state in which the electronic device 200 is underwater, the electronic device 200 may output (e.g., blink a display screen at a designated brightness (e.g., a maximum brightness level)) a notification for a lost alert.

Figure 4:
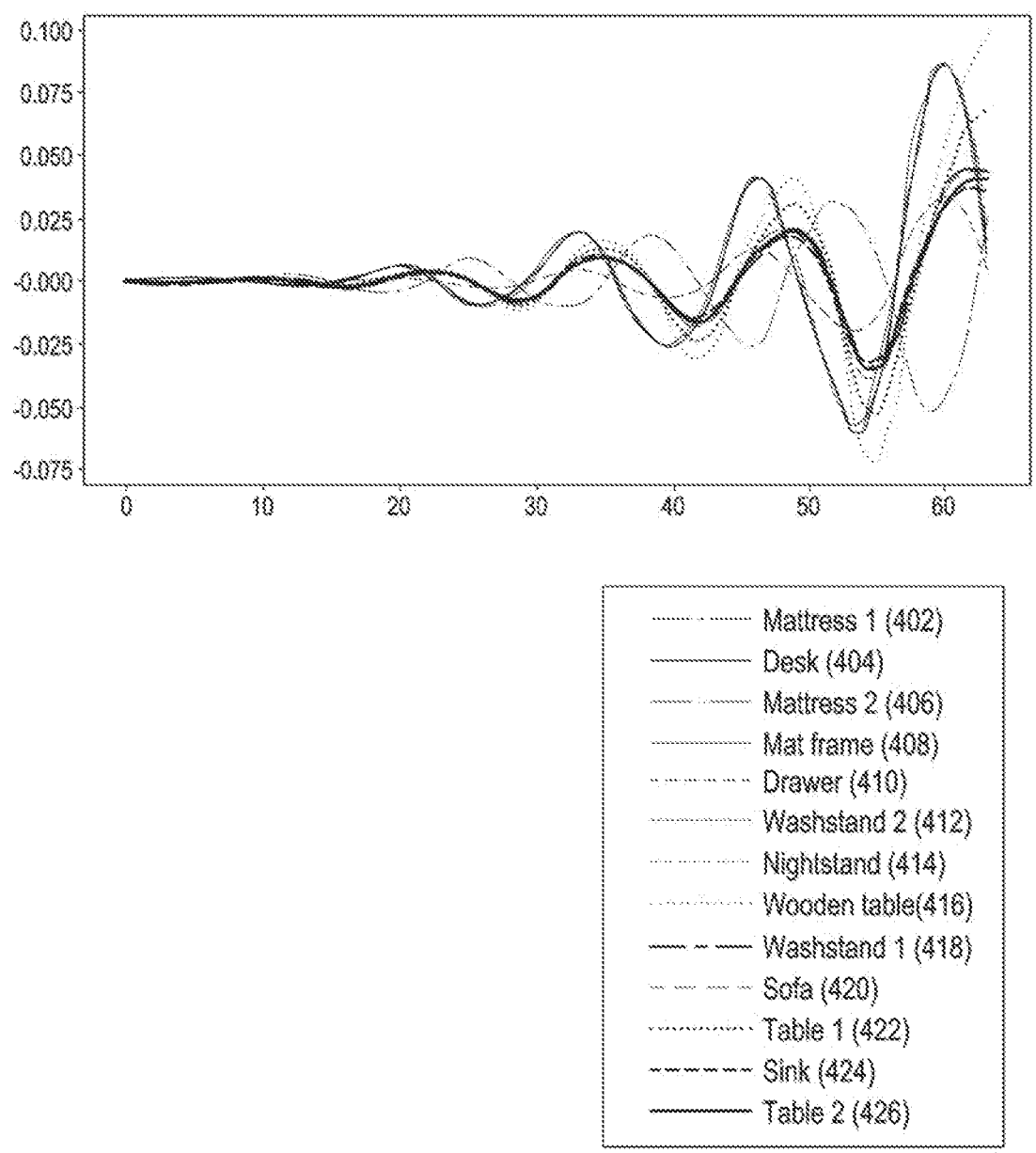
FIG. 4 illustrates recognition of a surrounding environment through a radar according to an embodiment.

FIG. 4 is a view illustrating recognition of a surrounding environment through a radar according to an embodiment.

Referring to FIG. 4, the electronic device 200 may recognize a surrounding environment of the electronic device 200 based on signal waveforms indicating a power level for each distance of radar signals measured through the radar 220. In an embodiment, a signal waveform 402 and a signal waveform 406 may indicate a situation in which the electronic device 200 is placed on a mattress. In an embodiment, a signal waveform 404 may indicate a situation in which the electronic device 200 is placed on a desk. In an embodiment, a signal waveform 408 may indicate a situation in which the electronic device 200 is placed on a mat frame. In an embodiment, a signal waveform 410 may indicate a situation in which the electronic device 200 is placed inside a drawer. In an embodiment, a signal waveform 412 and a signal waveform 418 may indicate a situation in which the electronic device 200 is placed on a washstand. In an embodiment, a signal waveform 414 may indicate a situation in which the electronic device 200 is placed on a nightstand. In an embodiment, a signal waveform 416 may indicate a situation in which the electronic device 200 is placed on a wooden table. In an embodiment, a signal waveform 420 may indicate a situation in which the electronic device 200 is placed on a sofa. In an embodiment, a signal waveform 422 and a signal waveform 426 may indicate a situation in which the electronic device 200 is placed on a table. In an embodiment, a signal waveform 424 may indicate a situation in which the electronic device 200 is placed on a sink.

In an embodiment, the electronic device 200 may compare a radar signal measured through the radar 220 with the signal waveforms 402, 404, 406, 408, 410 412, 414, 416, 418, 420, 422, 424, and 426 and, based on the comparison, determine a surrounding environment of the electronic device 200.

Figure 5:
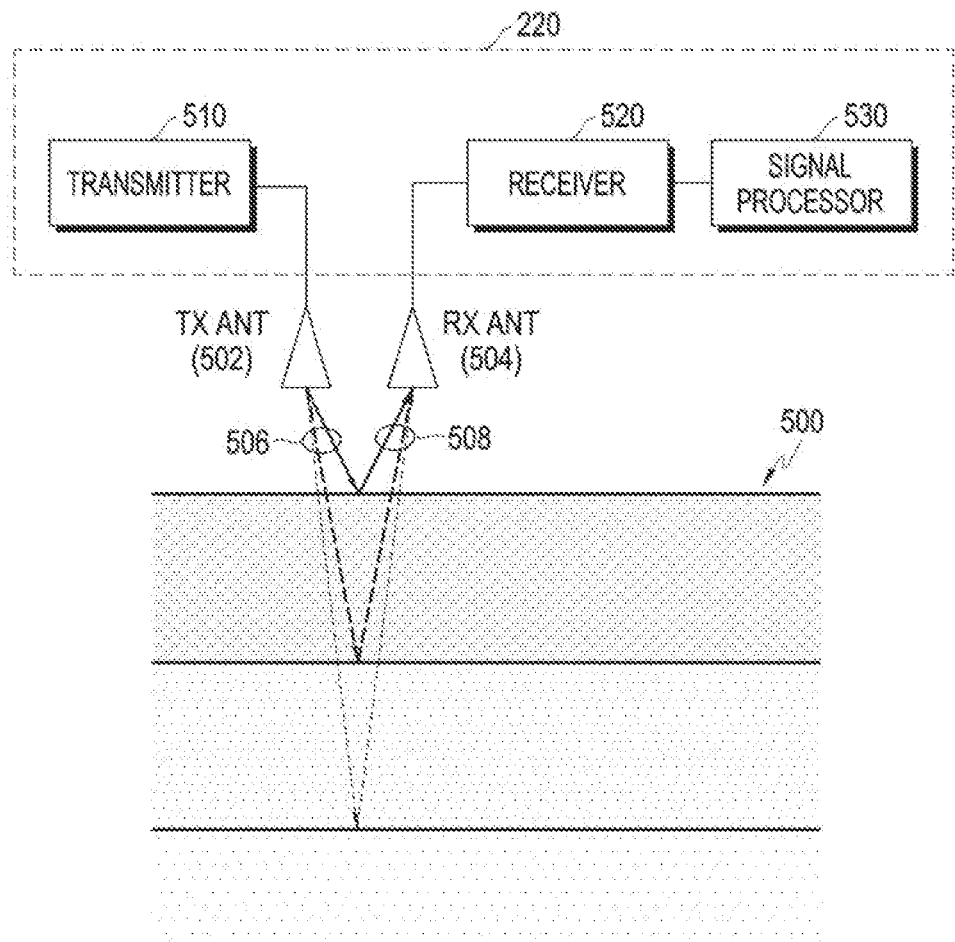
FIG. 5 illustrates recognition of a surrounding environment by using a radar according to an embodiment.

FIG. 5 is a view illustrating recognition of a surrounding environment by using a radar according to an embodiment.

Referring to FIG. 5, the radar 220 may include a transmitter 510, a receiver 520, a signal processor 530, and at least one transmission antenna 502 (e.g., the antenna 202), and at least one reception antenna 504 (e.g., the antenna 204). The transmitter 510 may transmit a designated electromagnetic signal 506 through the at least one transmission antenna 502. The electromagnetic signal 506 may be reflected from interfaces between materials of a target object 500 (e.g., a finger, a finger wearing a glove, water, a sofa, a mattress, and the like). The receiver 520 may receive the reflected electromagnetic signal (e.g., the radar signal 508) through the at least one reception antenna 504.

The signal processor 530 may process (e.g., sampling) the radar signal and output a processing result of the processing (e.g., the sampling) to, for example, the processor 210. In an embodiment, the electronic device 200 may recognize the target object 500 based on the radar signal or the processing result of the processing (e.g., the sampling) received through the signal processor 530. For example, the electronic device 200 may recognize a surrounding environment (e.g., underwater) in which the electronic device 200 is placed based on analysis of a signal pattern of the radar signal.

Figure 6:
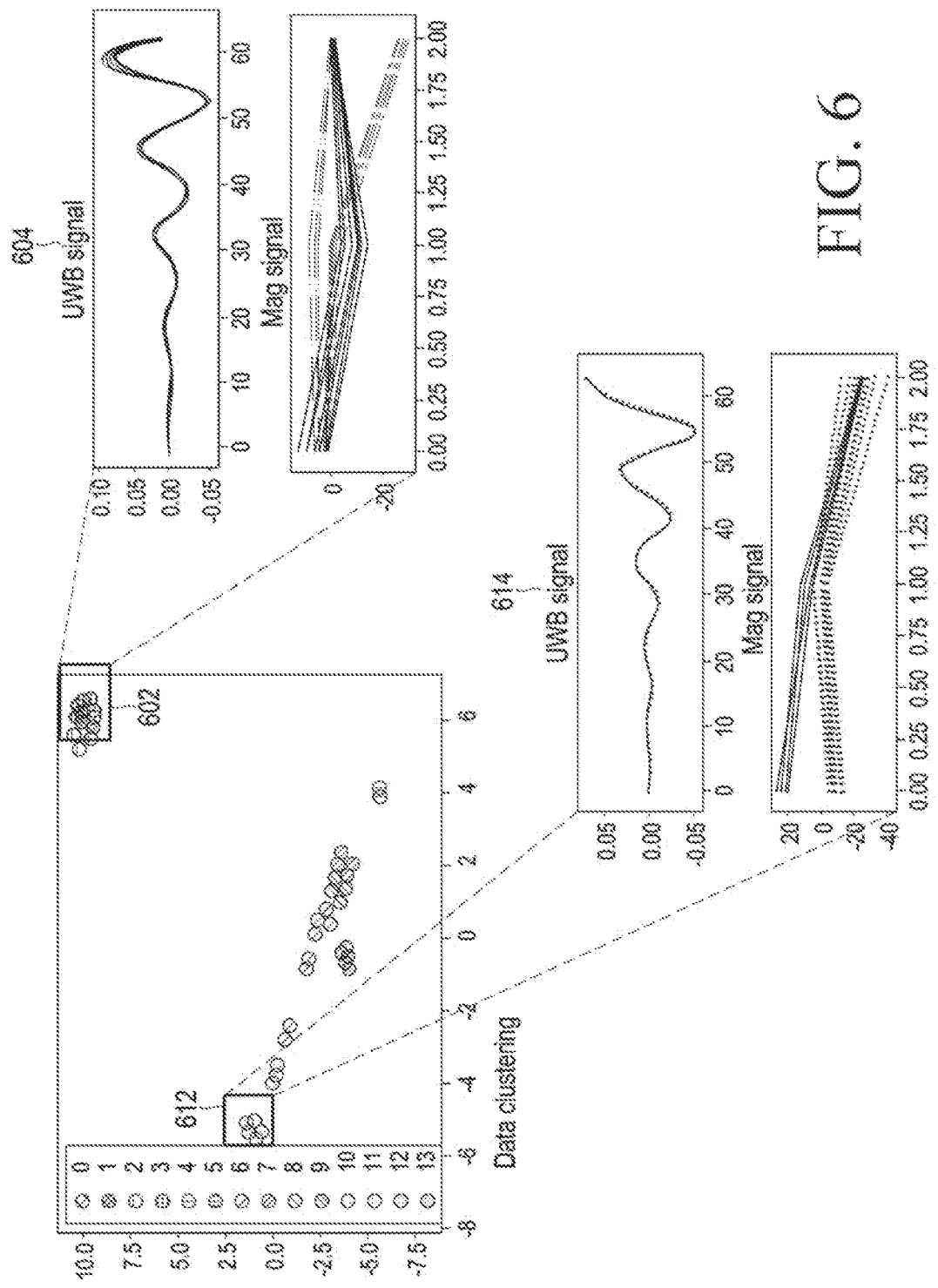
FIG. 6 illustrates clustered signal patterns having reflection characteristics by using a radar according to an embodiment.

FIG. 6 is a view illustrating clustered signal patterns having reflection characteristics by using a radar according to an embodiment.

Referring to FIG. 6, the electronic device 200 may compare a channel impulse response (CIR) feature of the radar signal, which is a signal transmitted by the radar 220 reflected from a target object (e.g., the target object 500) and then received, with pre-stored signal patterns (e.g., a first signal pattern 602 and a second signal pattern 612).

In an embodiment, the first signal pattern 602 may indicate, for example, a feature of a radar signal reflected from water, and the electronic device 200 may determine that the electronic device 200 is underwater based on that a first radar signal 604 (or a magnitude signal of the first radar signal 604) received through the radar 220 corresponds to the first signal pattern 602.

In an embodiment, the second signal pattern 612 may indicate, for example, a feature of a radar signal reflected from a surface of a glove worn on a finger, and the electronic device 200 may determine that a finger wearing a glove touches or is in contact with the electronic device 200 based on that a second radar signal 614 (or a magnitude signal of the second radar signal 614) received through the radar 220 corresponds to the second signal pattern 612.

Figure 7:
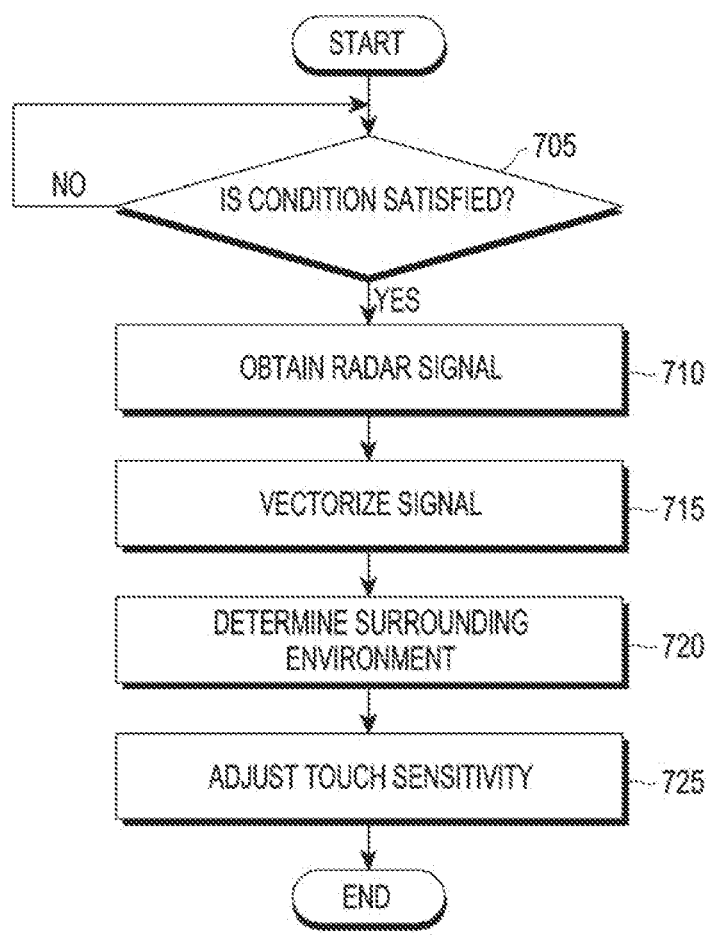
FIG. 7 illustrates a procedure of an electronic device for controlling touch sensitivity according to a surrounding environment according to an embodiment.

FIG. 7 is a flowchart illustrating a procedure of an electronic device for controlling touch sensitivity based on a surrounding environment according to an embodiment. In an embodiment, at least one of operations described below may be executed by the processor 210 of the electronic device 200. According to embodiments, at least one of operations described below may be omitted or modified, or the order thereof may be changed.

Referring to FIG. 7, in operation 705, the electronic device 200 may determine whether a predesignated condition (e.g., an environment recognition condition) for recognizing a surrounding environment through the radar 220 is satisfied. In an embodiment, the predesignated condition may include at least one of an arrival of a designated period, a change in acceleration, a touch hover, a change in radar signal, or a change in magnetic field. In a case that the designated condition is satisfied, the electronic device 200 may proceed to operation 710. In a case that the designated condition is not satisfied, the electronic device 200 may return to operation 705. An embodiment with respect to operation 705 may be described with reference to FIG. 9 below. In an embodiment, operation 705 may include at least one of operation 905, operation 910, operation 915, operation 920, or operation 925 of FIG. 9.

In operation 710, the electronic device 200 may obtain a radar signal through the radar 220. In an embodiment, the radar 220 (e.g., the transmitter 510) may transmit a designated electromagnetic signal based on an instruction from the processor 210 and the radar 220 (e.g., the receiver 520) may receive a radar signal corresponding to the electromagnetic signal reflected by a target object (e.g., the target object 500 that the electronic device 200 is in contact with) and returned. In an embodiment, the electronic device 200 may collect a radar signal including a designated number (e.g., 10 to 20 pieces) of data samples.

In operation 715, the electronic device 200 may generating a vectorized signal (hereinafter, referred to as a "vector signal") by vectorizing the radar signal by using a signal vectorization module (utilizing a deep learning model). In an embodiment, the vector signal (e.g., a vector signal 1308) may include one or more signal elements indicating feature parameters of a reflected signal (e.g., the radar signal). An embodiment of the signal vectorization may be explained with reference to FIG. 13. In an embodiment, operation 715 may be omitted and the electronic device 200 may proceed to operation 720 to determine a surrounding environment based on the radar signal.

In operation 720, the electronic device 200 may determine a surrounding environment of the electronic device 200 based on at least one of the vector signal and sensor data collected from the sensor 240. In an embodiment, the electronic device 200 may compare the vector signal with signal patterns (e.g., the signal pattern 602 or 612) according to a predesignated surrounding environment classification model to calculate similarity and determine a surrounding environment corresponding to the vector signal based on a value of the similarity. In an embodiment, the electronic device 200 may read signal patterns generated based on an environment classification model (e.g., at least one of a neural network (NN), a convolution neural network (CNN), long-short term memory (LS™), or Transformer) utilizing deep learning from memory (e.g., the memory 130) and compare at least one of the signal patterns with the vector signal to determine a surrounding environment.

For example, the surrounding environment may include at least one of the glove mode for detecting a user finger wearing a glove touching or coming in contact with the touch pad 230 of the electronic device 200, the underwater mode in which the electronic device 200 is located in water, or the soft surface mode in which the electronic device 200 is placed on a soft surface such as a sofa or a mattress.

In an embodiment, the electronic device 200 may include a wearable device (e.g., a smart watch), and the electronic device 200 may analyze a movement of the electronic device 200 through the radar 220 and/or the sensor 240 and determine that the movement of the electronic device 200 corresponds to a designated operation pattern (e.g., an operation of the user watching a smart watch).

In operation 725, the electronic device 200 may control an operation of the electronic device 200 based on the determined surrounding environment. In an embodiment, the electronic device 200 may control (e.g., increase or reduce a touch threshold value) the touch sensitivity of the touch pad 230 included in the electronic device 200 based on determination of the glove mode or the underwater mode. In an embodiment, the electronic device 200 may activate the sound mode for the incoming call notification of the electronic device 200 when the electronic device 200 is in a vibration mode, based on determining of the soft surface mode. One or more embodiments of operation 720 and operation 725 may include at least one procedure of FIG. 14, 15, 16, 17, or 18.

In an embodiment, the electronic device 200 may deactivate (e.g., a touch lock or water lock) a touch input of the touch pad 230 included in the electronic device 200 based on determining the underwater mode or activate an underwater operation function (e.g., a moisture removal function) of a hardware button (e.g., a volume button and/or power button) included in the electronic device 200. In an embodiment, the electronic device 200 may output a notification (e.g., blinking a display screen at a maximum brightness level) for a lost alert based on detecting that there is no movement of the electronic device 200 for a designated time period in the underwater mode.

In an embodiment, the electronic device 200 may return the touch threshold value of the touch pad 230 to its original state or return to the vibration mode for incoming call notification based on determining deviation (e.g., return to a normal mode) from the glove mode, the underwater mode, or the soft surface mode.

Figure 8:
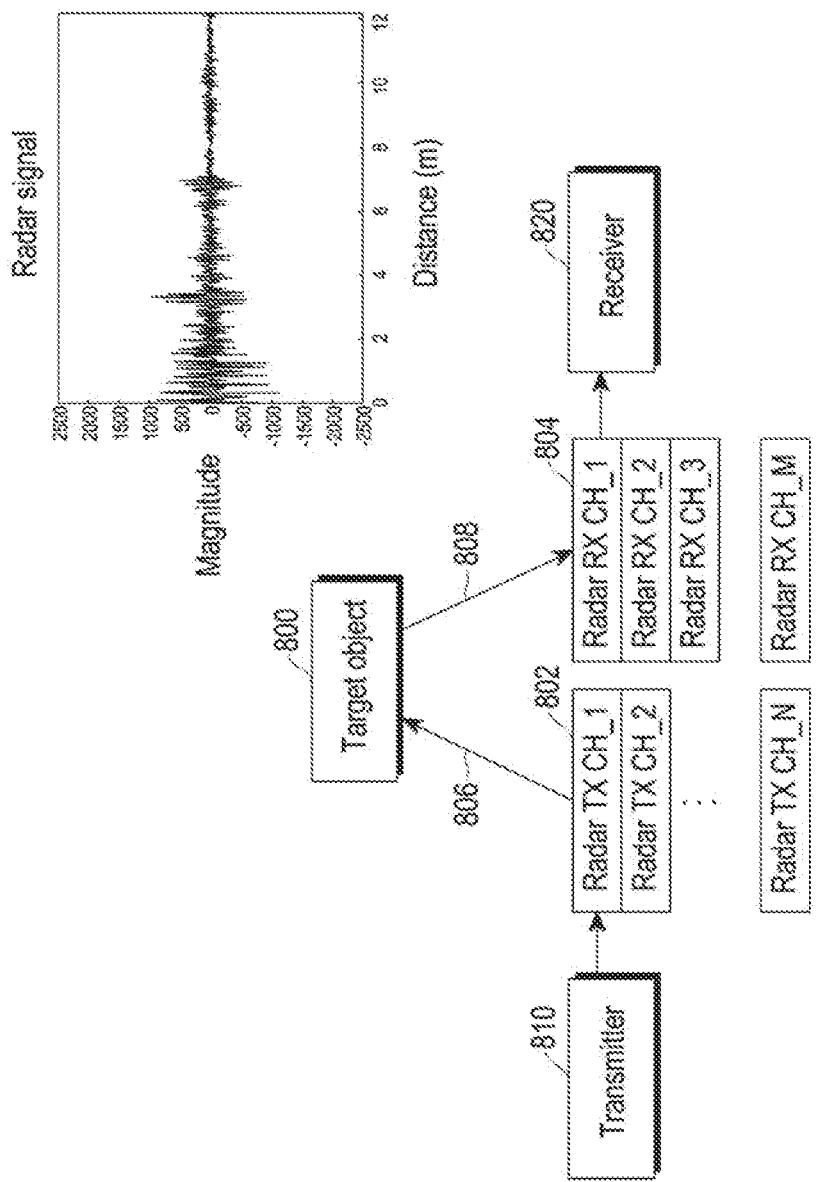
FIG. 8 illustrates an operation of determining an environment recognition condition by using a radar according to an embodiment.

FIG. 8 is a view illustrating an operation of determining an environment recognition condition by using a radar according to an embodiment.

Referring to FIG. 8, the radar 220 may include a transmitter 810, a receiver 820, at least one transmission antenna 802 (e.g., the antenna 202), and at least one reception antenna 804 (e.g., the antenna 204). In an embodiment, the transmitter 810 and the receiver 820 may be configured to support UWB or FMCW. The transmitter 810 may transmit a designated electromagnetic signal 806 through one or more radar transmission channels (e.g., Radar TX CH_1, Radar TX CH_2, . . . , and Radar TX CH_N) by using the at least one transmission antenna 802. The electromagnetic signal 806 may be reflected from a target object 800 (e.g., a finger, a finger wearing a glove, water, a sofa, a mattress, and the like). The receiver 820 may receive the reflected signal (e.g., a radar signal 808) through one or more radar reception channels (e.g., Radar RX CH_1, Radar RX CH_2, . . . , and Radar RX CH_M) by using the at least one reception antenna 804.

The electronic device 200 may analyze the radar signal 808 to determine whether the radar signal 808 is pre-registered in the electronic device 200. The electronic device 200 may compare the radar signal 808 with pre-stored signal patterns (e.g., the first signal pattern 602 and the second signal pattern 612). In a case that similarity between the radar signal 808 and the pre-stored signal pattern exceeds a designated threshold value, the electronic device 200 may determine that the radar signal 808 is pre-registered and determine a surrounding environment of the electronic device 200 based on a pre-registered signal pattern corresponding to the radar signal 808. In an embodiment, the electronic device 200 may update the corresponding pre-registered signal pattern based on the radar signal 808.

In one embodiment, in a case that similarity between the radar signal 808 and the pre-stored signal pattern does not exceed the threshold value, the electronic device 200 may determine that the radar signal 808 is not registered and register (e.g., store) a signal pattern of the radar signal 808. In an embodiment, the registered signal pattern of the radar signal 808 may be used for surrounding environment recognition.

Figure 9:
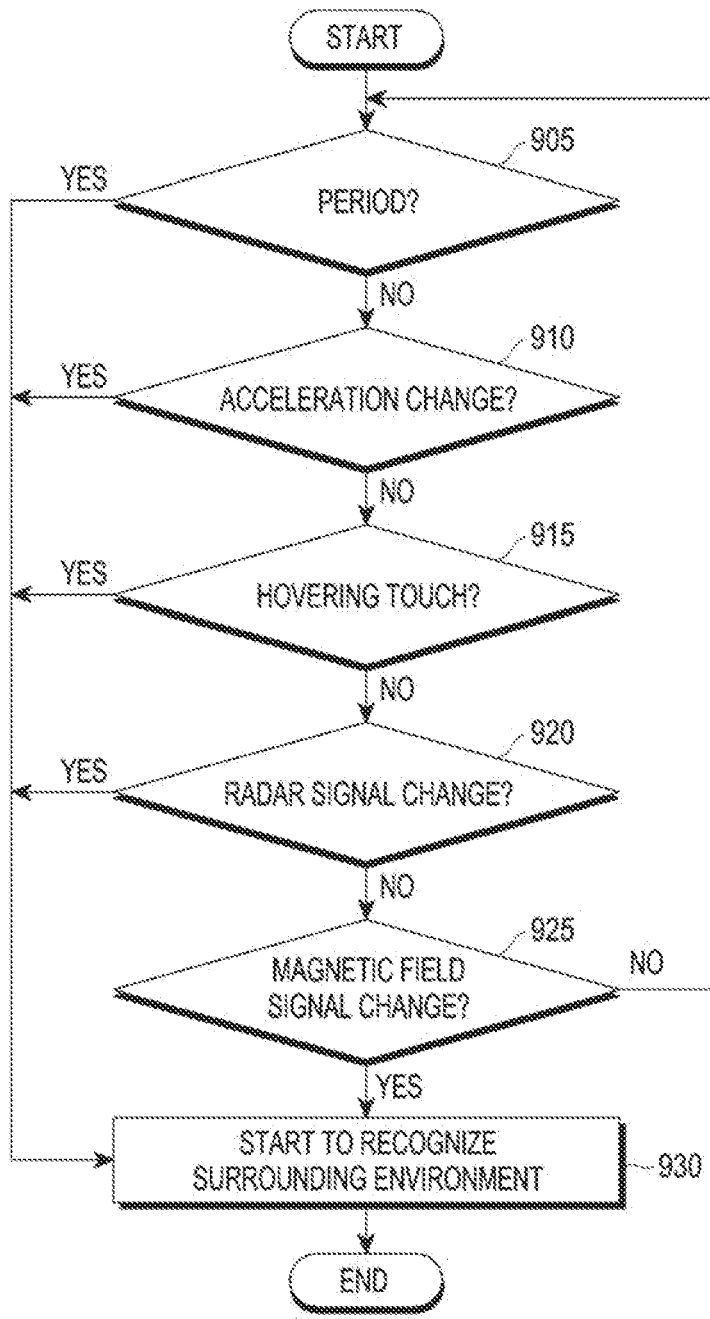
FIG. 9 illustrates an operation of determining an environment recognition condition according to an embodiment.

FIG. 9 is a flowchart illustrating an operation of determining an environment recognition condition according to an embodiment. In an embodiment, at least one of operations described below may be executed by the processor 210 of the electronic device 200. According to embodiments, at least one of operations described below may be omitted or modified, or the order thereof may be changed.

Referring to FIG. 9, in operation 905, the electronic device 200 may determine whether a predesignated period for recognizing a surrounding environment through the radar 220 has arrived. In a case that the designated period has arrived, the electronic device 200 may proceed to operation 930. In a case that the designated period has not arrived, the electronic device 200 may proceed to operation 910.

In operation 910, the electronic device 200 may determine whether a change in acceleration is detected. In an embodiment, the electronic device 200 may detect an acceleration change of the electronic device 200 based on sensor data collected by an acceleration sensor included in the sensor 240. In an embodiment, the electronic device 200 may determine a posture of the electronic device 200 of the user (carrying the electronic device 200) based on the acceleration change detected by the acceleration sensor. An embodiment of the posture detection based on an acceleration change may be explained with reference to FIG. 10. In a case that an acceleration change is detected, the electronic device 200 may proceed to operation 930. In a case that an acceleration change is not detected, the electronic device 200 may proceed to operation 915.

In operation 915, the electronic device 200 may determine whether a hovering touch with respect to the touch pad 230 is detected. In an embodiment, the electronic device 200 may detect a hovering touch of the electronic device 200 based on sensor data collected by a touch sensor included in the sensor 240. An embodiment of the detection of a hovering touch may be explained with reference to FIG. 11. In a case that a hovering touch is detected, the electronic device 200 may proceed to operation 930. In a case that a hovering touch is not detected, the electronic device 200 may proceed to operation 920.

In operation 920, the electronic device 200 may determine whether a change in radar signal is detected. In an embodiment, the electronic device 200 may detect a movement of the electronic device 200 based on identifying a movement of a nearby target object (e.g., the target object 800) by using a radar signal received through the radar 220. An embodiment of the movement detection based on a radar signal change may be explained with reference to FIG. 12. In a case that a radar signal change is detected, the electronic device 200 may proceed to operation 930. In a case that a radar signal change is not detected, the electronic device 200 may proceed to operation 925.

In operation 925, the electronic device 200 may determine whether a change in a magnetic field is detected. In an embodiment, the electronic device 200 may detect a change in a magnetic field around the electronic device 200 based on a change in sensor data (e.g., a magnetic sensor signal) collected by a magnetic sensor included in the sensor 240. In a case that a change of a magnetic field is detected, the electronic device 200 may proceed to operation 930. In a case that a magnetic field change is not detected, the electronic device 200 may return to operation 905.

In operation 930, the electronic device 200 may determine that the environment recognition condition is satisfied and start surrounding environment recognition. In an embodiment, the electronic device 200 may proceed to operation 710 for recognizing a surrounding environment, operate the radar 220, and obtain a radar signal through the radar 220.

Figure 10:
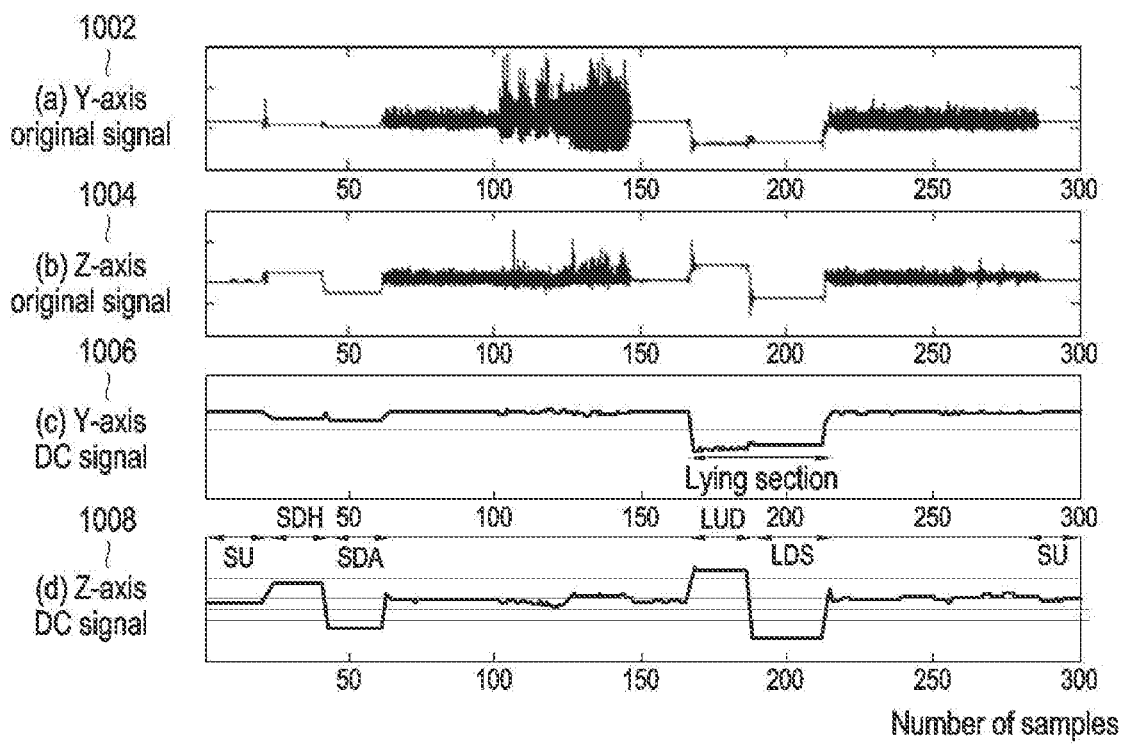
FIG. 10 illustrates examples of posture classification based on a change in signals measured by an acceleration sensor according to an embodiment.

FIG. 10 illustrates examples of posture classification based on a change in signals measured by an acceleration sensor according to an embodiment.

Graph (a) in FIG. 10 shows a Y-axis original signal 1002 measured by the acceleration sensor. Graph (b) in FIG. 10 shows a Z-axis original signal 1004 measured by the acceleration sensor. Graph (c) in FIG. 10 and graph (d) in FIG. 10 illustrate a Y-axis direct current (DC) signal 1006 and a Z-axis DC signal 1008 extracted through low-pass filtering of Y-axis and Z-axis signals measured in a posture changing section, respectively.

The electronic device 200 may detect at least one posture from among standing up (SU), sitting down with lowering subjects head (SDH), sitting down and leaning against (SDA), lying down straight (LDS), or lying upside down (LUD), based on a change in signal level of the signals (e.g., the Y-axis DC signal 1006 and the Z-axis DC signal 1008) measured by the acceleration sensor.

Figure 11:
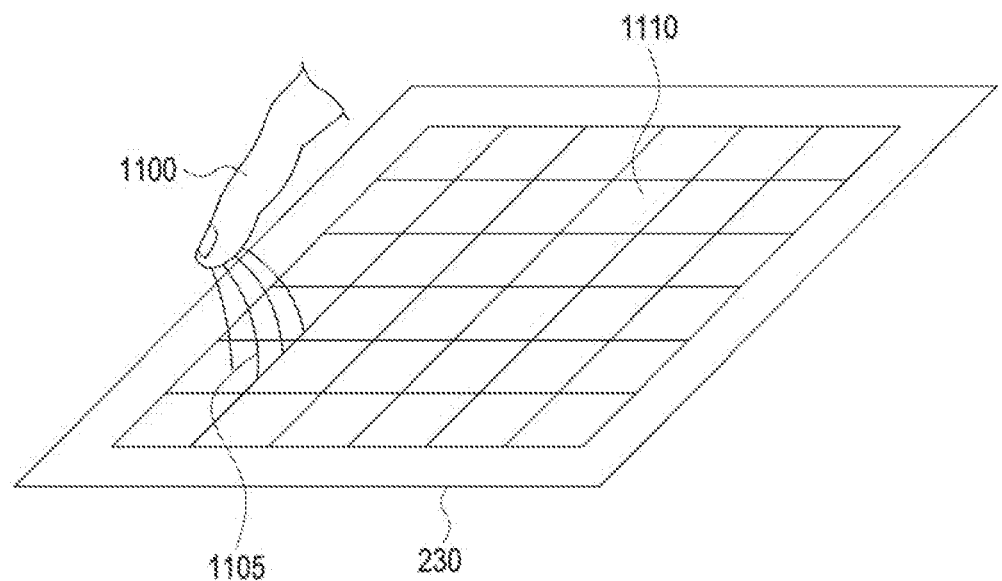
FIG. 11 illustrates detection of a hovering touch according to an embodiment.

FIG. 11 is a view illustrating a detection of a hovering touch according to an embodiment.

Referring to FIG. 11, the touch pad 230 (included in the electronic device 200) may include multiple electrodes 1110 capable of detecting a touch and hovering. The touch pad 230 may measure a capacitance at the electrodes 1110. For example, in a case that a measurement value of the capacitance exceeds a first threshold value, the electronic device 200 may determine that the finger 1100 comes in contact with the touch pad 230. For example, in a case that a measurement value of the capacitance exceeds a second threshold value which is lower than the first threshold value, the electronic device 200 may determine that the finger 110 approaches the touch pad 230 without contact (e.g., hovering), and may specify coordinates 1105 at which the capacitance exceeds the second threshold value.

Figure 12:
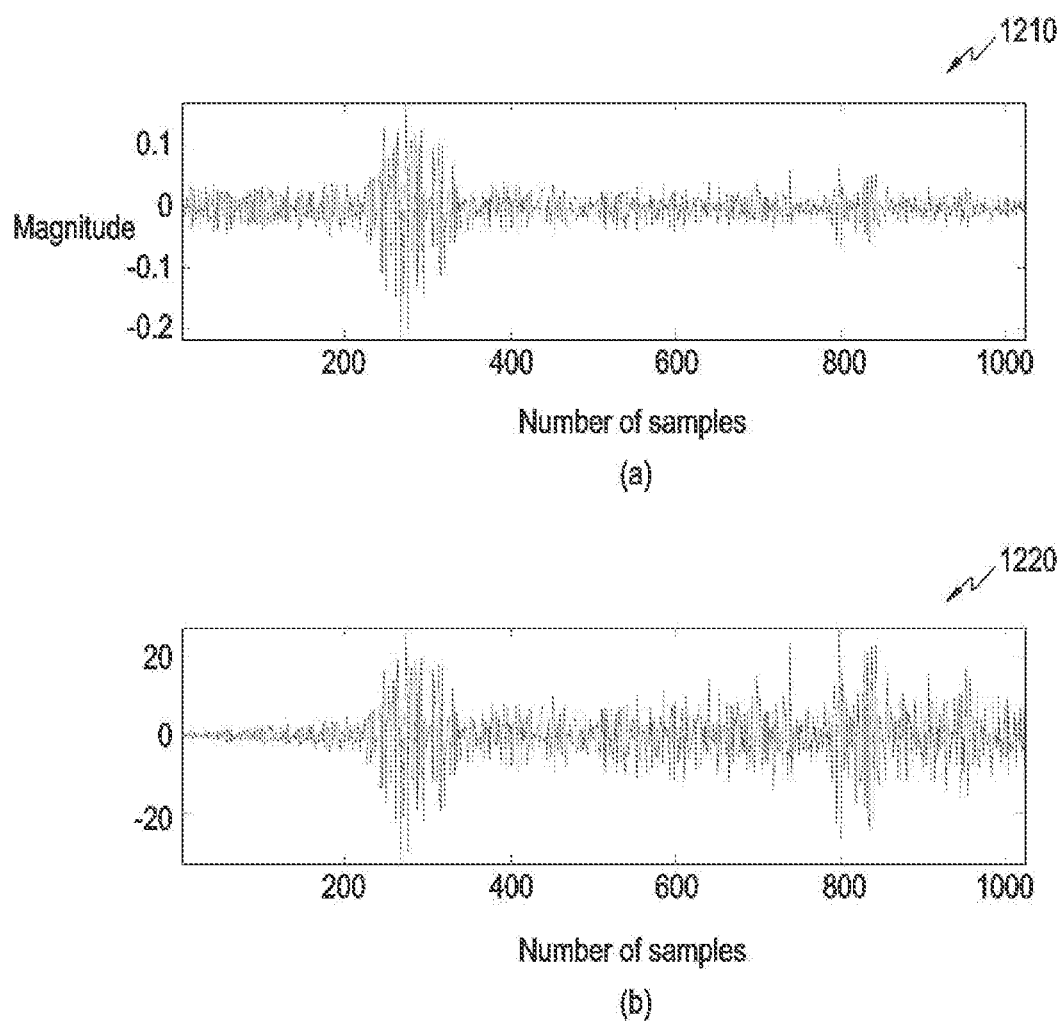
FIG. 12 illustrates views illustrating movement detection based on a radar signal change according to an embodiment.

FIG. 12 illustrates views illustrating movement detection based on a radar signal change according to an embodiment.

Referring to FIG. 12, the electronic device 200 may track a change of a radar signal received through the radar 220. In an embodiment, a size of a radar signal according to the number of samples may have a signal pattern 1210 shown in graph (a) of FIG. 12 when the electronic device 200 is not moving, and may have a signal pattern 1220 shown in graph (b) of FIG. 12 when the electronic device 200 is moving. The electronic device 200 may compare the radar signal received through the radar 220 with a pre-stored signal pattern (e.g., the signal pattern 1200) corresponding to a specific movement (e.g., lifting the electronic device 200 and bringing a display screen of the electronic device 200 to the eye of the user) of the electronic device 200 so as to detect a movement of the electronic device 200 based on the radar signal.

Figure 13:
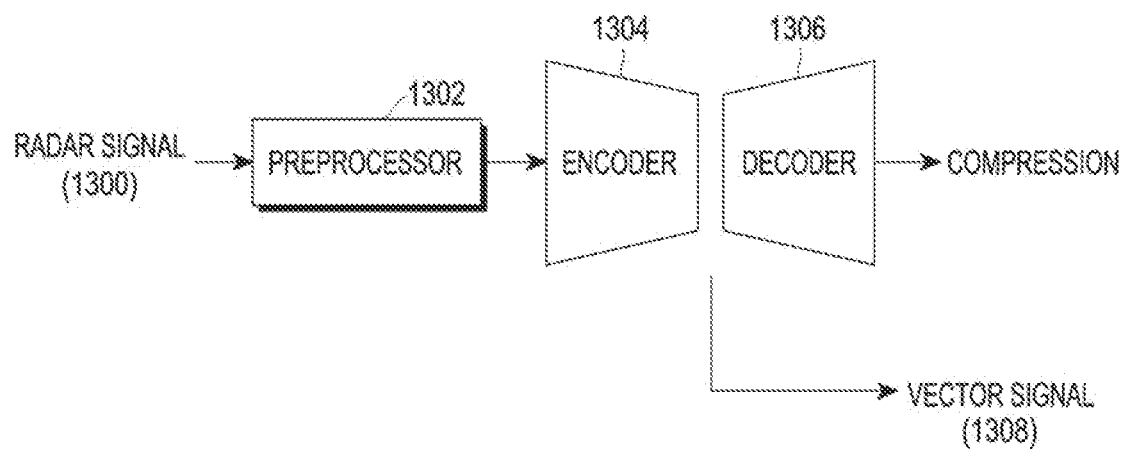
FIG. 13 illustrates vectorization of a radar signal according to an embodiment.

FIG. 13 is a view illustrating vectorization of a radar signal according to an embodiment.

Referring to FIG. 13, the electronic device 200 may include a pre-processor, an encoder 1304, and a decoder 1306. A radar signal (e.g., the radar signal 1300) received by the radar 220 may be converted, by the pre-processor 1302, into input layer data having a designated signal format for the encoder 1304. The encoder 1304 may compress the input layer data, according to a designated encoding method, to generate an expression vector of a hidden layer between an input layer and an output layer. The decoder 1306 may decompress the expression vector to generate (output) output layer data. The electronic device 200 may output a vector signal 1308 including the expression vector generated during the encoding and the decoding.

Figure 14:
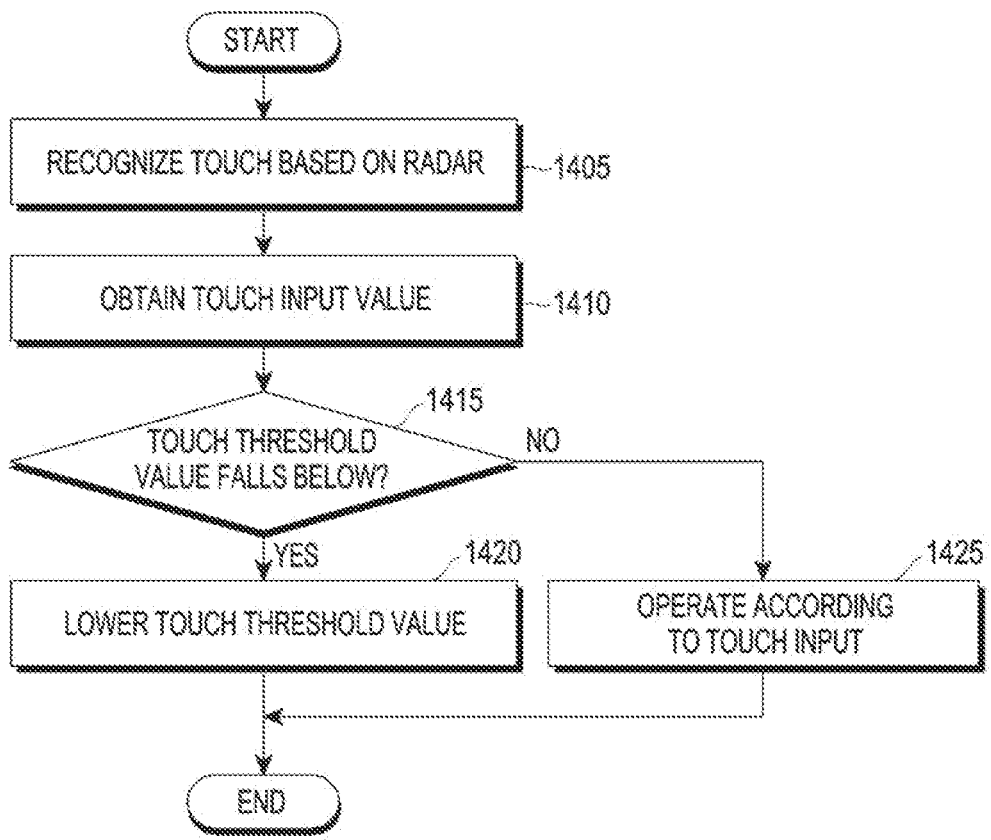
FIG. 14 illustrates radar-based operation control for preventing a touch error according to an embodiment.

FIG. 14 is a flowchart illustrating radar-based operation control for preventing a touch error according to an embodiment. In an embodiment, at least one of operations described below may be executed by the processor 210 of the electronic device 200. According to embodiments, at least one of operations described below may be omitted or modified, or the order thereof may be changed. In an embodiment, operation 720 and operation 725 may include at least one of operation 1405, 1410, 1415, 1420, or 1425.

Referring to FIG. 14, in operation 1405, the electronic device 200 may recognize a user's touch based on the radar 220. In an embodiment, the electronic device 200 may determine that a user's touch is detected, based on detecting existence of a touch device (e.g., a finger) at close range (e.g., within a designated distance) of the electronic device 200 based on the radar signal received through the radar 220. In an embodiment, the electronic device 200 may detect the touch at the front (e.g., a direction that the display faces) of the electronic device 200. The electronic device 200 may proceed to operation 1410 in response to (or based on) recognizing the touch through the radar 220.

In operation 1410, the electronic device 200 may obtain a touch input value (e.g., a physical quantity measured at an electrode) from the touch pad 230.

In operation 1415, the electronic device 200 may compare the touch input value with a designated touch threshold value associated with the touch sensitivity of the touch pad 230 and determine whether the touch input value falls below the touch threshold value. In a case that the touch input value is less than the touch threshold value, the electronic device 200 may proceed to operation 1420. In a case that the touch input value is equal to or greater than the touch threshold value, the electronic device 200 may proceed to operation 1425.

In operation 1420, the electronic device 200 may lower the touch threshold value for the touch pad 230. In an embodiment, the electronic device 200 may reduce the touch threshold value by a designated number of units, or change the touch threshold value to a designated lower value. The changed (reduced) touch threshold value may be used for determining a next touch input value obtained from the touch pad 230. Based on the reduced touch threshold value, the electronic device 200 may detect a user's touch through the touch pad 230 more sensitively.

Figure 15:
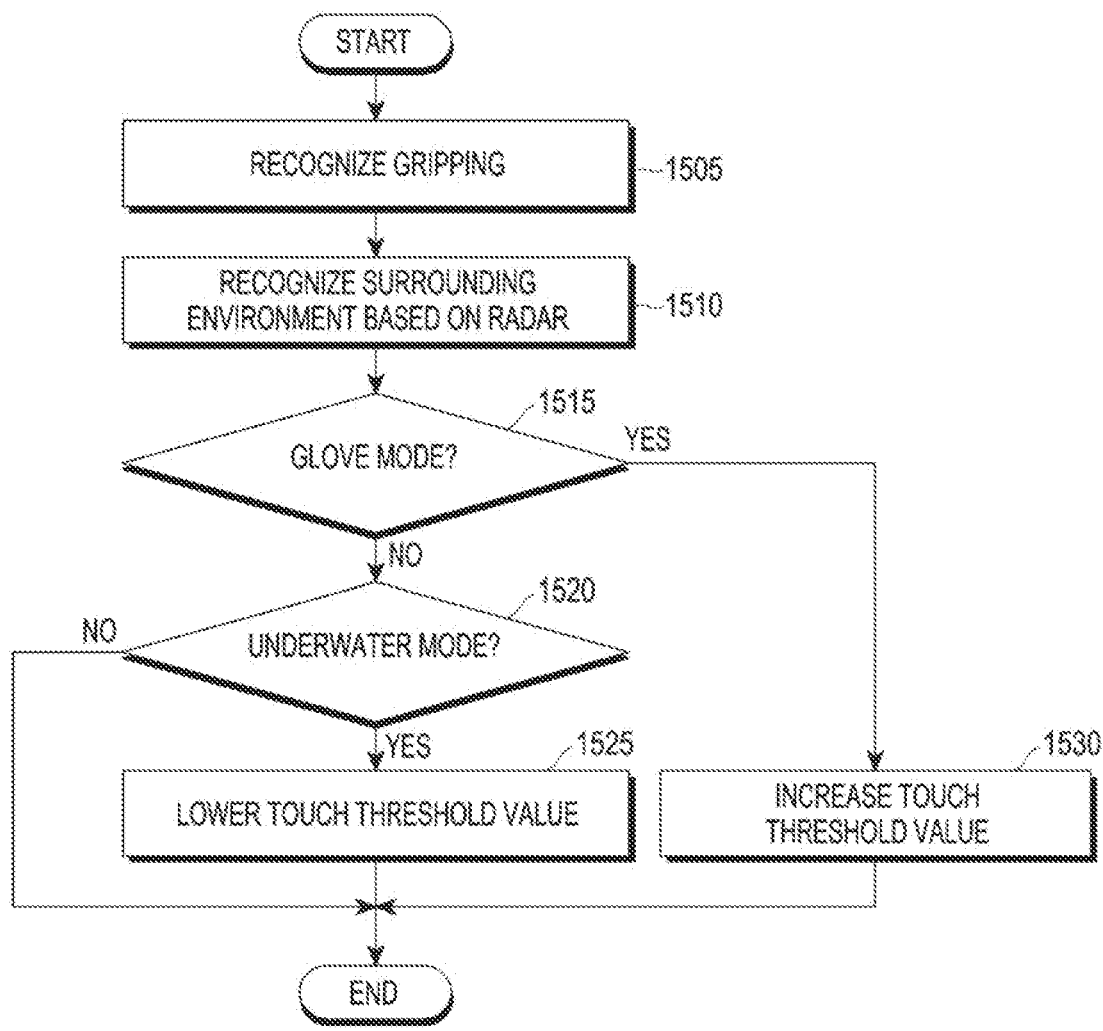
FIG. 15 illustrates radar-based operation control for improving touch sensitivity according to an embodiment.

FIG. 15 is a flowchart illustrating radar-based operation control for improving touch sensitivity according to an embodiment. In an embodiment, at least one of operations described below may be executed by the processor 210 of the electronic device 200. According to embodiments, at least one of operations described below may be omitted or modified, or the order thereof may be changed. In an embodiment, operation 720 and operation 725 may include at least one of operations 1505, 1510, 1515, 1520, 1525, or 1530.

Referring to FIG. 15, in operation 1505, the electronic device 200 may recognize that the user grips the electronic device 200. In an embodiment, the electronic device 200 may detect a grip of the electronic device 200 based on sensor data collected by at least one sensor (e.g., at least one of a magnetic sensor, a proximity sensor, or a touch sensor) included in the sensor 240. In an embodiment, the electronic device 200 may detect a grip of the electronic device 200 based on a radar signal obtained by the radar 220. In an embodiment, the electronic device 200 may detect a grip of the electronic device 200 based on a sensor data and/or a radar signal.

In operation 1510, the electronic device 200 may recognize a surrounding environment based on a radar signal obtained through the radar 220. In an embodiment, the electronic device 200 may identify a surrounding environment (e.g., the glove mode or the underwater mode) based on the radar signal based on comparing the radar signal with preregistered signal patterns (e.g., the signal patterns 602 and 612) corresponding to multiple surrounding environments.

In operation 1515, the electronic device 200 may determine whether the recognized surrounding environment indicates the glove mode. In a case that the surrounding environment indicates the glove mode, the electronic device 200 may proceed to operation 1530. In an embodiment, in a case that the surrounding environment does not indicate the glove mode, the electronic device 200 may proceed to operation 1520.

In operation 1520, the electronic device 200 may determine whether the recognized surrounding environment indicates the underwater mode. In a case that the surrounding environment indicates the underwater mode, the electronic device 200 may proceed to operation 1525. In an embodiment, in a case that the surrounding environment does not indicate the underwater mode, the electronic device 200 may end the procedure and maintain the touch threshold value associated with the touch sensitivity of the touch pad 230 in the normal mode.

In operation 1525, the electronic device 200 may lower the touch threshold value for the touch pad 230. In an embodiment, the electronic device 200 may reduce the touch threshold value by a designated number of units, or change the touch threshold value to a designated lower value. The changed (reduced) touch threshold value may be used for determining a next touch input value obtained from the touch pad 230. Based on the reduced touch threshold value, the electronic device 200 may detect a user's touch through the touch pad 230 more sensitively while the electronic device 200 is underwater.

In operation 1530, the electronic device 200 may increase the touch threshold value for the touch pad 230. In an embodiment, the electronic device 200 may increase the touch threshold value by a designated number of units, or change the touch threshold value to a designated greater value. The changed (increased) touch threshold value may be used for determining a next touch input value obtained from the touch pad 230. Based on the increased touch threshold value, the electronic device 200 may detect a user's finger wearing a glove more sensitively through the touch pad 230.

In another embodiment, the electronic device 200 may deactivate (e.g., touch lock) a touch input of the touch pad 230 instead of adjusting the touch threshold value of the touch pad 230 based on determining that the electronic device 200 is in the underwater mode. In an embodiment, the electronic device 200 may activate an underwater operation function of a hardware button (e.g., a volume button and/or a power button) included in the electronic device 200 based on determining that the electronic device 200 is in the underwater mode.

Figure 16:
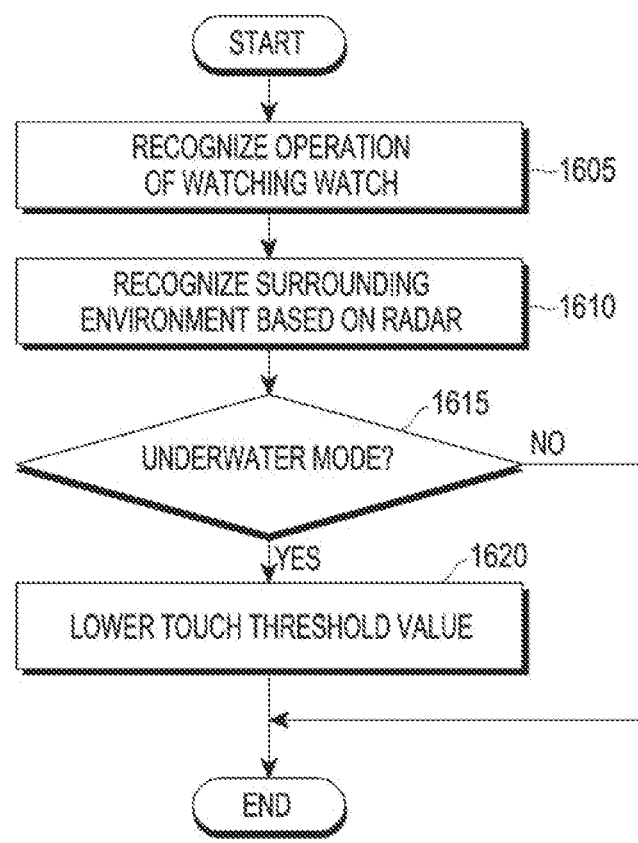
FIG. 16 illustrates radar-based operation control for improving touch sensitivity of a wearable device according to an embodiment.

FIG. 16 is a flowchart illustrating radar-based operation control for improving touch sensitivity of a wearable device according to an embodiment. In an embodiment, at least one of operations described below may be executed by the processor 210 of the electronic device 200. According to embodiments, at least one of operations described below may be omitted or modified, or the order thereof may be changed. In an embodiment, operation 720 and operation 725 may include at least one of operations 1605, 1610, 1615, or 1620.

Referring to FIG. 16, in operation 1605, the electronic device 200 may recognize the electronic device 200 moving in a designated operation pattern. In an embodiment, the electronic device 200 may correspond to a smart watch and the designated operation pattern may indicate, for example, an operation in which the user watches the smart watch. The electronic device 200 may detect that the movement of the electronic device 200 corresponds to the designated operation pattern, based on sensor data collected by at least one sensor (e.g., a geomagnetic sensor) included in the sensor 240. In an embodiment, the electronic device 200 may recognize a movement of the electronic device 200 based on sensor data and/or a radar signal.

In operation 1610, the electronic device 200 may recognize a surrounding environment based on a radar signal obtained through the radar 220. In an embodiment, the electronic device 200 may identify a surrounding environment (e.g., the underwater mode) based on the radar signal based on comparing the radar signal with preregistered signal patterns (e.g., the signal patterns 602 and 612) corresponding to multiple surrounding environments.

In operation 1615, the electronic device 200 may determine whether the recognized surrounding environment indicates the underwater mode. In a case that the surrounding environment indicates the underwater mode, the electronic device 200 may proceed to operation 1620. In an embodiment, in a case that the surrounding environment does not indicate the underwater mode, the electronic device 200 may end the procedure and maintain the touch threshold value for the touch pad 230 in the normal mode.

In operation 1620, the electronic device 200 may lower the touch threshold value associated with the touch sensitivity of the touch pad 230. In an embodiment, the electronic device 200 may reduce the touch threshold value by a designated number of units, or change the touch threshold value to a designated lower value. The changed (reduced) touch threshold value may be used for determining a next touch input value obtained from the touch pad 230. Based on the reduced touch threshold value, the electronic device 200 may detect a user's touch through the touch pad 230 more sensitively while the electronic device 200 (e.g., a smart watch) is underwater.

In another embodiment, the electronic device 200 may deactivate (e.g., touch lock or water lock) a touch input of the touch pad 230 instead of adjusting the touch threshold value of the touch pad 230 based on determining that the electronic device 200 is in the underwater mode. In an embodiment, the electronic device 200 may activate an underwater operation function of a hardware button (e.g., a volume button and/or a power button) included in the electronic device 200 based on determining that the electronic device 200 is in the underwater mode.

Figure 17:
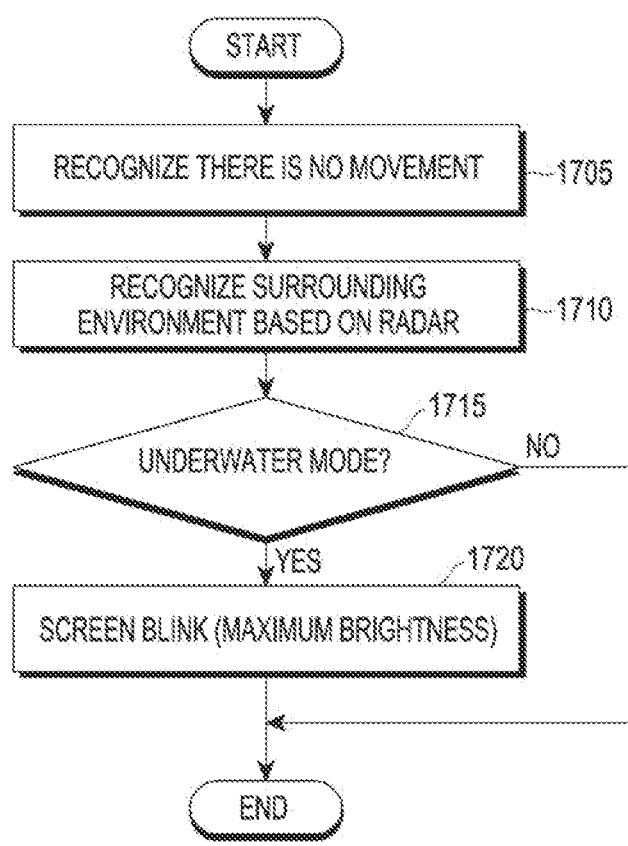
FIG. 17 illustrates radar-based operation control for a notification of loss according to an embodiment.

FIG. 17 is a flowchart illustrating radar-based operation control for a notification of loss according to an embodiment. In an embodiment, at least one of operations described below may be executed by the processor 210 of the electronic device 200. According to embodiments, at least one of operations described below may be omitted or modified, or the order thereof may be changed. In an embodiment, operation 720 and operation 725 may include at least one of operation 1705, 1710, 1715, or 1720.

Referring to FIG. 17, in operation 1705, the electronic device 200 may recognize that the electronic device 200 is in a stationary state (e.g., no movement for a designated period). In an embodiment, the electronic device 200 may detect that the electronic device 200 does not move for a designated time, based on sensor data collected by at least one sensor (e.g., a geomagnetic sensor) included in the sensor 240. In an embodiment, the electronic device 200 may recognize no movement of the electronic device 200 based on sensor data and/or a radar signal.

In operation 1710, the electronic device 200 may recognize a surrounding environment based on a radar signal obtained through the radar 220. In an embodiment, the electronic device 200 may identify a surrounding environment (e.g., the underwater mode) based on the radar signal based on comparing the radar signal with preregistered signal patterns (e.g., the signal patterns 602 and 612) corresponding to multiple surrounding environments.

In operation 1715, the electronic device 200 may determine whether the recognized surrounding environment indicates the underwater mode. In a case that the surrounding environment indicates the underwater mode, the electronic device 200 may proceed to operation 1720. In an embodiment, in a case that the surrounding environment does not indicate the underwater mode, the electronic device 200 may end the procedure.

In operation 1720, the electronic device 200 may output a notification (e.g., blinking a display screen at a maximum brightness level) for a loss alert. By using the above-described notification, the electronic device 200 may inform the user that the electronic device 200 (e.g., a smart watch) is underwater.

Figure 18:
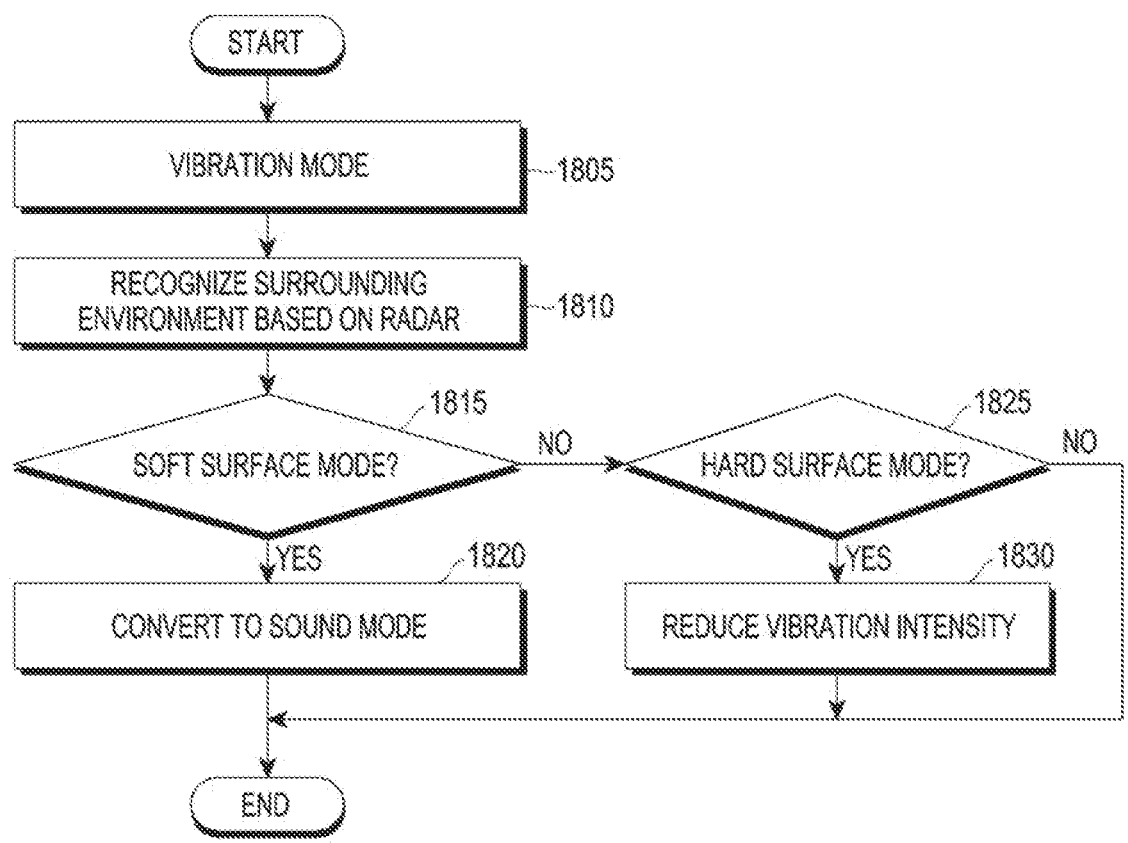
FIG. 18 illustrates radar-based operation control in a vibration mode according to an embodiment.

FIG. 18 is a flowchart illustrating radar-based operation control in a vibration mode according to an embodiment. In an embodiment, at least one of operations described below may be executed by the processor 210 of the electronic device 200. According to embodiments, at least one of operations described below may be omitted or modified, or the order thereof may be changed. In an embodiment, operation 720 and operation 725 may include at least one of operation 1805, operation 1810, operation 1815, operation 1820, operation 1825, or operation 1830.

Referring to FIG. 18, in operation 1805, the electronic device 200 may recognize that the electronic device 200 is in the vibration mode. In operation 1810, the electronic device 200 may recognize a surrounding environment based on a radar signal obtained through the radar 220. In an embodiment, the electronic device 200 may identify a surrounding environment (e.g., the soft surface mode or hard surface mode) corresponding to the radar signal, based on comparing the radar signal with preregistered signal patterns corresponding to multiple surrounding environments.

For example, the soft surface mode may indicate a situation in which the electronic device 200 is placed on a relatively soft material, such as a sofa or a mattress. The electronic device 200 may determine that the surrounding environment of the electronic device 200 corresponds to the soft surface mode, based on the radar signal corresponding to a predesignated signal pattern (e.g., the signal patterns of the signal waveforms 402, 406, and 422) indicating a soft material. For example, the hard surface mode may indicate a situation in which the electronic device 200 is placed on a relatively hard material, such as a table, a desk, or a chair.

The electronic device 200 may determine that the surrounding environment of the electronic device 200 corresponds to the hard surface mode, based on the radar signal corresponding to a predesignated signal pattern (e.g., the signal patterns of the signal waveforms 404, 410, 412, 414, 416, 418, 422, 424, and 426) indicating a hard material.

In operation 1815, the electronic device 200 may determine whether the recognized surrounding environment indicates the soft surface mode. In a case that the surrounding environment indicates the soft surface mode, the electronic device 200 may proceed to operation 1820. In an embodiment, in a case that the surrounding environment does not indicate the soft surface mode, the electronic device 200 may proceed to operation 1825.

In operation 1825, the electronic device 200 may determine whether the recognized surrounding environment indicates the hard surface mode. In a case that the surrounding environment indicates the hard surface mode, the electronic device 200 may proceed to operation 1830. In an embodiment, in a case that the surrounding environment does not indicate the hard surface mode, the electronic device 200 may end the procedure and the normal mode (and the vibration intensity) of the electronic device 200 may be maintained.

In operation 1820, the electronic device 200 may release the vibration mode of the electronic device 200 and activate a sound mode (e.g., perform conversion to a sound mode). In an embodiment, the electronic device 200 may output an incoming call notification sound simulating a predesignated vibration pattern in response to reception of an incoming call while in the soft surface mode. The mode conversion may allow the electronic device 200 to better notify the user of the incoming call notification while the electronic device 200 is placed on a soft material.

In operation 1830, the electronic device 200 may lower the vibration intensity of the electronic device 200. In an embodiment, the electronic device 200 may reduce the vibration intensity by a designated number of units, or change the vibration intensity to a designated lower value. Based on the changed (reduced) vibration intensity, the electronic device 200 may provide a more improved usage environment to the user.

According to an embodiment, an electronic device 200 may include memory 250 storing instructions, a radar 220 configured to transmit an electromagnetic signal and receive a radar signal which is a reflected signal of the electromagnetic signal reflected from at least one target object, a touch pad 230 configured to detect a touch of a user based on a touch threshold value, and at least one processor 210 operatively coupled with the memory, the radar, and the touch pad. The instructions may, when executed by the at least one processor, cause the electronic device to obtain the radar signal received by the radar. The instructions may, when executed by the at least one processor, cause the electronic device to identify a surrounding environment of the electronic device based on the radar signal. The instructions may, when executed by the at least one processor, cause the electronic device to adjust and configure the touch threshold value based on the surrounding environment.

In an embodiment, the instructions cause the electronic device to identify the surrounding environment by comparing the radar signal with one or more signal patterns respectively indicating one or more surrounding environments.

In an embodiment, the electronic device may further include a sensor including at least one of an acceleration sensor or a magnetic sensor. In an embodiment, the instructions cause the electronic device to determine whether a designated environment recognition condition is satisfied by using the radar and/or the sensor, and obtain the radar signal through the radar, based on that the designated environment recognition condition is satisfied.

In an embodiment, the designated environment recognition condition may include at least one of an arrival of a designated period, a detection of a change in acceleration of the electronic device by the sensor, a detection of a hovering touch by the touch pad, a detection movement of the electronic device by the radar, or detecting a change in a magnetic field by the sensor.

In an embodiment, the instructions cause the electronic device to detect the user's touch on the electronic device through the radar, determine whether a touch input value measured by the touch pad is smaller than the touch threshold value, and reduce the touch threshold value, based on identifying that the touch input value is smaller than the touch threshold value in a state in which the user's touch is detected through the radar.

In an embodiment, the instructions cause the electronic device to recognize that the user grips the electronic device through the radar and/or the sensor, and increase the touch threshold value, based on the surrounding environment indicating a glove mode in which the user touches the touch pad with a finger wearing a glove in a state in which the electronic device is gripped.

In an embodiment, the instructions cause the electronic device to reduce the touch threshold value, based on the surrounding environment indicating an underwater mode in which the electronic device is underwater in a state in which the electronic device is gripped.

In an embodiment, the electronic device may include a smart watch. In an embodiment, the instructions cause the electronic device to identify that the electronic device moves according to a designated operation pattern through the sensor, and reduce the touch threshold value, based on the surrounding environment indicating an underwater mode in which the electronic device is underwater in a state of the identifying that the electronic device moves based on the designated operation pattern.

In an embodiment, the instructions cause the electronic device to identify that the electronic device has no movement for a designated period through the sensor, and blink a display screen of the electronic device at a designated brightness level, based on the surrounding environment indicating an underwater mode in which the electronic device is underwater in a state in which the electronic device has no movement for a designated period.

In an embodiment, the instructions cause the electronic device to identify that the electronic device is in a vibration mode, convert the electronic device into a sound mode, based on the surrounding environment indicating a soft surface mode in which the electronic device is placed on a soft material in a state in which the electronic device is in the vibration mode, and reduce a vibration intensity for the vibration mode of the electronic device, based on the surrounding environment indicating a hard surface mode in which the electronic device is placed on a hard material in a state in which the electronic device is in the vibration mode.

According to an embodiment, an operation method performed by an electronic device 200 may include transmitting (710) an electromagnetic signal through a radar 220 of the electronic device 200, and obtaining a radar signal which is a reflected signal of the electromagnetic signal reflected from at least one target object. The method may include identifying (720) a surrounding environment of the electronic device based on the radar signal. The method may include adjusting (725) a touch threshold value for a touch pad 230 of the electronic device based on the surrounding environment.

In an embodiment, the identifying the surrounding environment may comprise comparing the radar signal with one or more signal patterns respectively indicating one or more surrounding environments.

In an embodiment, the method may further include determining (705) whether a designated environment recognition condition is satisfied by using the radar and/or the sensor of the electronic device. The radar signal may be obtained based on identifying that the designated environment recognition condition is satisfied.

In an embodiment, the designated environment recognition condition may include at least one of an arrival of a designated period, a detection of a change in acceleration of the electronic device by the sensor, a detection of a hovering touch by the touch pad, a detection of movement of the electronic device by the radar, or a detection of a change in a magnetic field by the sensor.

In an embodiment, the method may further include detecting (1405) a user's touch on the electronic device through the radar, determining (1415) whether a touch input value measured by the touch pad is smaller than the touch threshold value, and reducing (1420) the touch threshold value, based on identifying that the touch input value is smaller than the touch threshold value in a state in which the user's touch is detected through the radar.

In an embodiment, the method may further include recognizing (1505) that the user grips the electronic device through the radar and/or the sensor, and increasing (1530) the touch threshold value, based on the surrounding environment indicating a glove mode in which the user touches the touch pad with a finger wearing a glove in a state in which the electronic device is gripped.

In an embodiment, the method may further include reducing (1525) the touch threshold value, based on the surrounding environment indicating an underwater mode in which the electronic device is underwater in a state in which the electronic device is gripped.

In an embodiment, the method may further include identifying (1605) that the electronic device corresponds to a smart watch and the electronic device moves according to a designated operation pattern through the sensor, and reducing (1620) the touch threshold value, based on the surrounding environment indicating an underwater mode in which the electronic device is underwater in a state of identifying that the electronic device moves according to the designated operation pattern.

In an embodiment, the method may further include identifying (1705) that the electronic device has no movement for a designated period through the sensor, and blinking (1720) a display screen of the electronic device 200 at a designated brightness level, based on the surrounding environment indicating an underwater mode in which the electronic device is underwater in a state in which the electronic device has no movement for a designated period.

In an embodiment, the method may further include identifying (1805) that the electronic device is in a vibration mode, converting (1820) the electronic device into a sound mode, based on the surrounding environment indicating a soft surface mode in which the electronic device is placed on a soft material in a state in which the electronic device is in the vibration mode, and reducing (1830) a vibration intensity for the vibration mode of the electronic device, based on the surrounding environment indicating a hard surface mode in which the electronic device is placed on a hard material in a state in which the electronic device is in the vibration mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   memory storing instructions;
   a radar configured to transmit an electromagnetic signal and receive a radar signal which is a reflected signal of the electromagnetic signal, the reflected signal being reflected from at least one target object of a surrounding environment of the electronic device;
   a touch pad configured to detect a touch of a user based on a touch threshold value; and
   at least one processor operatively coupled with the memory, the radar, and the touch pad, the instructions, when executed by the at least one processor, causing the electronic device to:
   obtain the radar signal received via the radar;
   identify, based on the radar signal, the surrounding environment of the electronic device; and
   adjust the touch threshold value based on the surrounding environment that is identified based on the radar signal.

2. The electronic device of claim 1, wherein the instructions cause the electronic device to identify the surrounding environment by comparing the radar signal with one or more signal patterns respectively indicating one or more surrounding environments.

3. The electronic device of claim 1, further comprising a sensor comprising at least one of an acceleration sensor or a magnetic sensor, and
   wherein the instructions cause the electronic device to:
   determine whether a designated environment recognition condition is satisfied by using the radar or the sensor; and
   based on identifying that the designated environment recognition condition is satisfied, obtain the radar signal through the radar.

4. The electronic device of claim 3, wherein the designated environment recognition condition comprises at least one of an arrival of a designated period, a detection of a change in acceleration of the electronic device by the sensor, a detection of a hovering touch by the touch pad, a detection of a movement of the electronic device by the radar, or a detection of a change in a magnetic field by the sensor.

5. The electronic device of claim 1, wherein the instructions cause the electronic device to:
   detect the user's touch on the electronic device through the radar;
   determine whether a touch input value measured by the touch pad is smaller than the touch threshold value; and
   based on identifying that the touch input value is smaller than the touch threshold value in a state in which the user's touch is detected through the radar, reduce the touch threshold value.

6. The electronic device of claim 3, wherein the instructions cause the electronic device to:
   recognize that the user grips the electronic device, through the radar or the sensor; and
   based on the surrounding environment indicating a glove mode in which the user touches the touch pad with a finger wearing a glove in a state in which the electronic device is gripped, increase the touch threshold value.

7. The electronic device of claim 3, wherein the instructions cause the electronic device to, based on the surrounding environment indicating an underwater mode in which the electronic device is underwater in a state in which the electronic device is gripped, reduce the touch threshold value.

8. The electronic device of claim 3, wherein the instructions cause the electronic device to:
   identify that the electronic device corresponds to a smart watch and identify, through the sensor, that the electronic device moves based on a designated operation pattern; and
   based on the surrounding environment indicating the underwater mode in which the electronic device is underwater in a state of the identifying that the electronic device moves based on the designated operation pattern, reduce the touch threshold value.

9. The electronic device of claim 3, wherein the instructions cause the electronic device to:
   identify, through the sensor, that the electronic device has no movement for a designated period; and
   based on the surrounding environment indicating the underwater mode in which the electronic device is underwater in a state in which the electronic device has no movement for the designated period, blink a display screen of the electronic device at a designated brightness level.

10. The electronic device of claim 1, wherein the instructions cause the electronic device to:
    identify that the electronic device is in a vibration mode;
    based on the surrounding environment indicating a soft surface mode in which the electronic device is placed on a soft material in a state in which the electronic device is in the vibration mode, convert the electronic device into a sound mode; and based on the surrounding environment indicating a hard surface mode in which the electronic device is placed on a hard material in a state in which the electronic device is in the vibration mode, reduce a vibration intensity for the vibration mode of the electronic device.

11. A method performed by an electronic device, the method comprising:
transmitting an electromagnetic signal through a radar of the electronic device, and obtaining a radar signal which is a reflected signal of the electromagnetic signal via the radar, the reflected signal being reflected from at least one target object of a surrounding environment of the electronic device;
identifying the surrounding environment of the electronic device based on the radar signal; and
adjusting a touch threshold value for a touch pad of the electronic device based on the surrounding environment identified based on the radar signal.

12. The method of claim 11, wherein the identifying the surrounding environment comprises comparing the radar signal with one or more signal patterns respectively indicating one or more surrounding environments.

13. The method of claim 11, further comprising determining whether a designated environment recognition condition is satisfied by using the radar or a sensor of the electronic device, and
wherein the radar signal is obtained based on identifying that the designated environment recognition condition is satisfied.

14. The method of claim 13, wherein the designated environment recognition condition comprises at least one of an arrival of a designated period, a detection of a change in acceleration of the electronic device by the sensor, a detection of a hovering touch by the touch pad, a detection of a movement of the electronic device by the radar, or a detection of a change in a magnetic field by the sensor.

15. The method of claim 12, further comprising:
detecting a user's touch on the electronic device through the radar;
determining whether a touch input value measured by the touch pad is smaller than the touch threshold value;
based on identifying that the touch input value is smaller than the touch threshold value in a state in which the user's touch is detected through the radar, reducing the touch threshold value.

16. The method of claim 13, further comprising:
recognizing that the user grips the electronic device, through the radar or the sensor; and
based on the surrounding environment indicating a glove mode in which the user touches the touch pad with a finger wearing a glove in a state in which the electronic device is gripped, increasing the touch threshold value.

17. The method of claim 13, further comprising, based on the surrounding environment indicating an underwater mode in which the electronic device is underwater in a state in which the electronic device is gripped, reducing the touch threshold value.

18. The method of claim 13, further comprising:
identifying that the electronic device corresponds to a smart watch and that the electronic device moves according to a designated operation pattern, through the sensor; and
based on the surrounding environment indicating the underwater mode in which the electronic device is underwater in a state of identifying that the electronic device moves according to the designated operation pattern, reducing the touch threshold value.

19. The method of claim 13, further comprising:
identifying that the electronic device has no movement for a designated period through the sensor;
based on the surrounding environment indicating the underwater mode in which the electronic device is underwater in a state in which the electronic device has no movement for the designated period, blinking a display screen of the electronic device at a designated brightness level.

20. The method of claim 13, further comprising:
identifying that the electronic device is in a vibration mode;
based on the surrounding environment indicating a soft surface mode in which the electronic device is placed on a soft material in a state in which the electronic device is in the vibration mode, converting the electronic device into a sound mode; and
based on the surrounding environment indicating a hard surface mode in which the electronic device is placed on a hard material in a state in which the electronic device is in the vibration mode, reducing a vibration intensity for the vibration mode of the electronic device.

* * * * *